United States Patent
Banerjee et al.

(10) Patent No.: US 8,593,728 B2
(45) Date of Patent: Nov. 26, 2013

(54) MULTILAYER PHOTONIC STRUCTURES

(75) Inventors: Debasish Banerjee, Ann Arbor, MI (US); Benjamin Alan Grayson, Ann Arbor, MI (US); Minjuan Zhang, Ann Arbor, MI (US); Masahiko Ishil, Aichi (JP)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 726 days.

(21) Appl. No.: 12/686,861

(22) Filed: Jan. 13, 2010

(65) Prior Publication Data
US 2010/0208338 A1 Aug. 19, 2010

Related U.S. Application Data

(63) Continuation-in-part of application No. 12/389,256, filed on Feb. 19, 2009.

(51) Int. Cl.
*F21V 9/04* (2006.01)
*F21V 9/06* (2006.01)
*G02B 5/20* (2006.01)

(52) U.S. Cl.
CPC ..................... *G02B 5/208* (2013.01)
USPC .......................... 359/359; 359/589

(58) Field of Classification Search
None
See application file for complete search history.

(56) References Cited

U.S. PATENT DOCUMENTS

| | | |
|---|---|---|
| 3,247,392 A | 4/1966 | Thelen |
| 3,769,515 A | 10/1973 | Clark, Jr. |
| 3,885,408 A | 5/1975 | Clark, Jr. |
| 3,910,681 A | 10/1975 | Elliott et al. |
| 4,079,605 A | 3/1978 | Bartels |
| 4,449,126 A | 5/1984 | Pekker |
| 4,525,023 A | 6/1985 | Dorschner |
| 4,556,599 A | 12/1985 | Sato et al. |
| 4,643,518 A | 2/1987 | Taniguchi |
| 4,673,914 A | 6/1987 | Le |
| 4,714,308 A | 12/1987 | Sawamura et al. |
| 4,868,559 A | 9/1989 | Pinnow |
| 5,007,710 A | 4/1991 | Nakajima et al. |

(Continued)

FOREIGN PATENT DOCUMENTS

| | | |
|---|---|---|
| JP | 2000220331 | 8/2000 |
| JP | 2000329933 | 11/2000 |

(Continued)

OTHER PUBLICATIONS

International Search Report for PCT/US2010/022378 mailed Mar. 30, 2010.

(Continued)

*Primary Examiner* — Derek S Chapel
(74) *Attorney, Agent, or Firm* — Dinsmore & Shohl LLP

(57) ABSTRACT

A multilayer photonic structure may include a plurality of coating layers of high index dielectric material of index of refraction $n_H$ and a plurality of coating layers of low index dielectric material of index of refraction $n_L$ alternately arranged with a first coating layer and a last coating layer of the multi-layer photonic structure comprise low index material. An index-thickness of each coating layer of the multilayer photonic structure is different than every other coating layer of the multilayer photonic structure. The multilayer photonic structure has a first high reflectivity bandwidth, a second high reflectivity bandwidth and a low reflectivity bandwidth wherein the low reflectivity bandwidth is positioned between the first high reflectivity bandwidth and the second high reflectivity bandwidth.

20 Claims, 9 Drawing Sheets

(56) References Cited

U.S. PATENT DOCUMENTS

| | | | |
|---|---|---|---|
| 5,043,593 | A | 8/1991 | Tsutsumi et al. |
| 5,132,661 | A | 7/1992 | Pinnow |
| 5,138,468 | A | 8/1992 | Barbanell |
| 5,245,329 | A | 9/1993 | Gokcebay |
| 5,279,657 | A | 1/1994 | Phillips et al. |
| 5,283,431 | A | 2/1994 | Rhine |
| 5,323,416 | A | 6/1994 | Bhat et al. |
| 5,491,470 | A | 2/1996 | Veligdan |
| 5,543,665 | A | 8/1996 | Demarco |
| 5,561,420 | A | 10/1996 | Kleefeldt et al. |
| 5,571,624 | A | 11/1996 | Phillips et al. |
| 5,653,792 | A | 8/1997 | Phillips et al. |
| 5,691,844 | A | 11/1997 | Oguchi et al. |
| 5,850,309 | A | 12/1998 | Shirai et al. |
| 5,889,603 | A | 3/1999 | Roddy et al. |
| 6,049,419 | A | 4/2000 | Wheatley et al. |
| 6,055,079 | A | 4/2000 | Hagans et al. |
| 6,130,780 | A | 10/2000 | Joannopoulos et al. |
| 6,156,115 | A | 12/2000 | Pfaff et al. |
| 6,180,025 | B1 | 1/2001 | Schoenfeld et al. |
| 6,331,914 | B1 | 12/2001 | Wood, II et al. |
| 6,387,457 | B1 | 5/2002 | Jiang et al. |
| 6,399,228 | B1 | 6/2002 | Simpson |
| 6,433,931 | B1 | 8/2002 | Fink et al. |
| 6,534,903 | B1 | 3/2003 | Spiro et al. |
| 6,565,770 | B1 | 5/2003 | Mayer et al. |
| 6,574,383 | B1 | 6/2003 | Erchak et al. |
| 6,618,149 | B1 | 9/2003 | Stirton |
| 6,624,945 | B2 | 9/2003 | Fan et al. |
| 6,665,770 | B2 | 12/2003 | Meyer et al. |
| 6,667,095 | B2 | 12/2003 | Wheatley et al. |
| 6,873,393 | B2 | 3/2005 | Ma |
| 6,887,526 | B1 | 5/2005 | Arit et al. |
| 6,894,838 | B2 | 5/2005 | Mizrahi et al. |
| 6,903,873 | B1 | 6/2005 | Joannopoulos et al. |
| 6,927,900 | B2 | 8/2005 | Liu et al. |
| 6,997,981 | B1 | 2/2006 | Coombs et al. |
| 7,098,257 | B2 | 8/2006 | Rink et al. |
| 7,123,416 | B1 | 10/2006 | Erdogan et al. |
| 7,141,297 | B2 | 11/2006 | Condo et al. |
| 7,184,133 | B2 | 2/2007 | Coombs et al. |
| 7,190,524 | B2 | 3/2007 | Grawert et al. |
| 7,215,473 | B2 | 5/2007 | Fleming |
| 7,267,386 | B2 | 9/2007 | Hesch |
| 7,367,691 | B2 | 5/2008 | Lin |
| 7,410,685 | B2 | 8/2008 | Rosenberger et al. |
| 7,446,142 | B2 | 11/2008 | Meisenburg et al. |
| 7,483,212 | B2 | 1/2009 | Cho et al. |
| 7,903,339 | B2 | 3/2011 | Banerjee et al. |
| 7,980,711 | B2 | 7/2011 | Takayanagi et al. |
| 2001/0022151 | A1 | 9/2001 | Sliwinski et al. |
| 2002/0129730 | A1 | 9/2002 | Yanagimato et al. |
| 2002/0129739 | A1 | 9/2002 | Yanagimoto et al. |
| 2003/0059549 | A1 | 3/2003 | Morrow et al. |
| 2004/0047055 | A1 | 3/2004 | Mizrahi et al. |
| 2004/0156984 | A1 | 8/2004 | Vitt et al. |
| 2004/0179267 | A1 | 9/2004 | Moon et al. |
| 2004/0246477 | A1 | 12/2004 | Moon et al. |
| 2004/0263983 | A1 | 12/2004 | Acree |
| 2004/0265477 | A1 | 12/2004 | Nabatova-Gabain et al. |
| 2005/0126441 | A1 | 6/2005 | Skelhorn |
| 2005/0235714 | A1 | 10/2005 | Lindstrom |
| 2006/0030656 | A1 | 2/2006 | Tarng et al. |
| 2006/0081858 | A1 | 4/2006 | Lin et al. |
| 2006/0159922 | A1 | 7/2006 | O'Keefe |
| 2006/0222592 | A1 | 10/2006 | Burda |
| 2007/0221097 | A1 | 9/2007 | Tarng et al. |
| 2009/0046368 | A1 | 2/2009 | Banerjee et al. |
| 2009/0082659 | A1 | 3/2009 | Ham et al. |
| 2009/0153953 | A1 | 6/2009 | Banerjee et al. |
| 2009/0303044 | A1 | 12/2009 | Furuichi et al. |
| 2010/0208338 | A1 | 8/2010 | Banerjee et al. |
| 2010/0209593 | A1 | 8/2010 | Banerjee et al. |
| 2010/0213485 | A1 | 8/2010 | McKenzie et al. |

FOREIGN PATENT DOCUMENTS

| | | |
|---|---|---|
| JP | 2005144925 | 6/2005 |
| JP | 2006097426 | 4/2006 |
| JP | 2008038382 | 2/2008 |
| JP | 200022031 | 8/2008 |
| WO | WO02054030 | 7/2002 |
| WO | WO03062871 | 3/2003 |

OTHER PUBLICATIONS

Hongqiang et al, "Disordered dielectric high reflectors with broadband from visible to infrared," Applied Physics Letters, American Institute of Physics, Melville, NY, US, vol. 74, No. 22, dated May 31, 2009.

Xifre-Perez et al, "Porous silicon mirrors with enlarged omnidirectional band gap," Journal of Applied Physics, American Institute of Physics, Melville, NY, US, vol. 97, No. 6, dated Mar. 9, 2005.

Office Action mailed Jul. 20, 2011 as it relates to U.S. Appl. No. 12/389,221.

Office Action mailed Dec. 27, 2011 as it relates to U.S. Appl. No. 12/389,221.

Office Action mailed Oct. 20, 2011 as it relates to U.S. Appl. No. 12/853,801.

"Laser 2000 Gmbttp://www.laser2000.de/fileadmin/Produkdaten/SK_WEB/Datenblaetter_SEM/SEMROCK-StopLine-Notchfilter.pdf, accessed Feb. 2, 2010".

Bendiganavale A.K., Malshe, V.C., "Infrared Reflective Inorganic Pigments", Recent Patents on Chemical Engineering, 2008, 1, 67-79.

D.P. Young, Jr., et al. "Comparison of Avian Responses to UV-Light Reflective Paint on Wind Turbines," National Renewable Energy Laboratory, Subcontract Report, Jan. 2003.

Maier, E.J. "To Deal With the Invisible": On the biological significance of ultraviolet sensitivity in birds. Naturwissenschaften 80: 476-478, 1993.

Nison, J., "Twinkle, Twinkle Little Star," Asia Pacific Coating Journal, Feb. 2004.

Fink, Joel "A Dielectric Omnidirectional Reflector", E.L. Thomas, Science, vol. 282, Nov. 27, 1988.

Lin, Weihua, "Design and Fabrication of Omnidirectional Reflectors in the Visible Range" Journal of Modern Optics, vol. 52, No. 8, 1155 (2005).

Chen, Kevin M. "SiO2/TiO2 Omnidirectional Reflector and Microcavity Resonator Via the Sol-Gel Method", Appl. Phys. Lett., vol. 75, No. 24, Dec. 13, 1999.

Almedia, R.M.,"Photonic Bandgap Materials and Structures by Sol-Gel Processing", Journal of Non-Crystalline Solids, 405-499 (2003).

Deopura, M., "Dielectric Omnidirectional Visible Reflector," Optics Letters, Aug. 1, 2001, vol. 16, No. 15.

Decourby, R.G., "Planar Omnidirectional Reflectors in Chalcogenide Glass and Polymer" Optics Express, 6228, Aug. 8, 2005.

Clement, T.J., "Improved Omnidirectional Reflectors in Chalcogenide Glass and Polymer by Using the Silver Doping Technique", Optics Express, 14, 1789 (2006).

Bryant, A., "All-Silicon Omnidirectional Mirrors Based on One-Dimensional Crystals", Appl. Phys. Lett. vol. 82, No. 19, May 12, 2003.

Chigrin, D.N., "Observation of Total Omnidirectional Reflection From a One-Dimensional Dielectric Lattice", Appl. Phys. A. 68, 25-28 (1999).

Park, Y., "GaAs-based Near-infrared Omnidirectional Reflector", Appl. Phys. Lett., vol. 82, No. 17, Apr. 28, 2003.

H-Y Lee, "Design and Evaluation of Omnidirectional One-Dimensional Photonic Crystals", Journal of Appl. Phys. vol. 93, No. 2, Jan. 15, 2003.

Banerjee, Debasish, "Narrow-band Omnidirectional Structural Color", SAE World Congress 01-1049 (2008).

U.S. Appl. No. 12/853,801, filed Aug. 10, 2010 entitled "Methods for Identifying Articles of Manufacture".

Office Action mailed Sep. 22, 2011 as it relates to U.S. Appl. No. 12/853,718.

(56) References Cited

OTHER PUBLICATIONS

Office Action mailed Apr. 26, 2012 as it relates to U.S. Appl. No. 12/389,221.
Office Action mailed Feb. 22, 2012 as it relates to U.S. Appl. No. 12/902,763.
Notice of Allowance mailed Feb. 16, 2012 as it relates to U.S. Appl. No. 12/853,718.
Office Action mailed Apr. 11, 2012 as it relates to U.S. Appl. No. 12/389,256.
Office Action mailed Mar. 28, 2012 as it relates to U.S. Appl. No. 12/853,801.
Notice of Allowance mailed May 29, 2012 as it relates to U.S. Appl. No. 12/853,801.
Rejection dated Dec. 5, 2012, including portions translated to English, filed in Chinese Application No. 201080007817.1.
Rejection dated Mar. 5, 2013 including portions translated to English, filed in Japanese Application No. 2011-173986.
Rejection dated Jun. 25, 2012, filed in U.S. Appl. No. 12/902,763.
Rejection dated Dec. 5, 2012 including portions translated to English, filed in Chinese Application No. 201080007817.1.
Rejection dated Mar. 5, 2013 including portions translated to English filed in Japanese Application No. 2011-173986.
Office Action dated Oct. 17, 2012; filed in U.S. Appl. No. 12/686,861.
Notice of Allowance dated Apr. 25, 2013 filed in U.S. Appl. No. 12/686,861.

MULTILAYER PHOTONIC STRUCTURES

CROSS REFERENCE TO RELATED APPLICATIONS

The present application is a continuation-in-part of U.S. patent application Ser. No. 12/389,256 filed Feb. 19, 2009 and entitled "METHODS FOR PRODUCING OMNI-DIRECTIONAL MULTILAYER PHOTONIC STRUCTURES" which is herein incorporated by reference.

TECHNICAL FIELD

Embodiments described herein generally relate to multilayer photonic structures and, more specifically, to multilayer photonic structures with first and second high reflectivity bandwidths for use as omnidirectional reflectors.

BACKGROUND

Sunlight comprises a range of wavelengths in the electromagnetic spectrum including ultraviolet (UV), visible, and infrared (IR) light. The color of a pigment associated with a particular object is determined by the wavelengths of light reflected by the pigment and observed by the human eye. For example, sunlight or white light comprises a roughly equal mixture of wavelengths in the visible spectrum. When white light is incident on a pigment, some wavelengths of the white light are absorbed while others are reflected. The reflected wavelengths determine the color of the pigment. For many pigments, reflectivity may be strongly dependent on the angle of the light incident on the object. Accordingly, the pigment may reflect different wavelengths of light for different angles of incidence while absorbing others. As such, the pigment may not necessarily behave as an omni-directional reflector for all wavelengths of light at all angles of incidence. This results in the pigment having a color shift for different angles of incident light.

Similar effects may be found with UV and IR light. Specifically, for different angles of incidence, a pigment may reflect certain wavelengths of UV and/or IR light while absorbing others which may result in undesirable effects. For example, when UV light is absorbed by a polymeric material, the polymeric material may break down the chemical bonds of the polymer. This process is called photo-degradation and may cause cracking, chalking, color change and/or the loss of physical properties of the polymeric material. Similarly, near IR sunlight (780 nm-2100 nm) carries 53% of the total solar energy, which, when absorbed, causes heat to build up on the surface of the object which may result in undesirable thermal conditions. On certain objects, such as automobiles, buildings and other structures, this build-up of heat may reduce the efficiency and/or performance of certain systems such as, for example, HVAC systems.

Accordingly, a need exists for alternative multilayer photonic structures which reflect at least two different bandwidths of electromagnetic radiation.

SUMMARY

In one embodiment, a multilayer photonic structure includes a plurality of coating layers of high index dielectric material having an index of refraction $n_H$ and a plurality of coating layers of low index dielectric material having an index of refraction $n_L$. The coating layers of high index dielectric material and the coating layers of low index dielectric material may be alternately arranged and a first coating layer and a last coating layer of the multilayer photonic structure comprise low index material. An index-thickness of each coating layer of low index dielectric material may be different than an index-thickness of other coating layers of low index dielectric material and an index-thickness of each coating layer of high index dielectric material may be different than an index-thickness of other coating layers of high index dielectric material. The index-thicknesses of coating layers of low index dielectric material may be different than the index-thicknesses of coating layers of high index dielectric material. The multilayer photonic structure has a first high reflectivity bandwidth, a second high reflectivity bandwidth and a low reflectivity bandwidth for electromagnetic radiation incident on a surface of the multilayer photonic structure from 0 degrees to 45 degrees, wherein the low reflectivity bandwidth is positioned between the first high reflectivity bandwidth and the second high reflectivity bandwidth.

In another embodiment, a UV-IR reflector may include a plurality of coating layers of high index dielectric material having an index of refraction $n_H$ and a plurality of coating layers of low index dielectric material having an index of refraction $n_L$. The coating layers of high index dielectric material and the coating layers of low index dielectric material may be alternately arranged and a first coating layer and a last coating layer of the UV-IR reflector may include a low index material. An index-thickness of each coating layer of low index dielectric material may be different than an index-thickness of other coating layers of low index dielectric material and an index-thickness of each coating layer of high index dielectric material may be different than an index-thickness of other coating layers of high index dielectric material. The index-thicknesses of coating layers of low index dielectric material may be different than the index-thicknesses of coating layers of high index dielectric material. The UV-IR reflector may have a first high reflectivity bandwidth with a reflectance of 50% or greater for wavelengths of electromagnetic radiation in an ultraviolet portion of the electromagnetic spectrum and a second high reflectivity bandwidth with a reflectance of 80% or greater for wavelengths of light in an infrared portion of the electromagnetic spectrum.

In yet another embodiment, an article of manufacture includes a multilayer photonic structure. The multilayer photonic structure includes a plurality of coating layers of high index dielectric material having an index of refraction $n_H$ and a plurality of coating layers of low index dielectric material having an index of refraction $n_L$. The coating layers of high index dielectric material and the coating layers of low index dielectric material may be alternately arranged and a first coating layer and a last coating layer of the multilayer photonic structure comprise low index material. An index-thickness of each coating layer of low index dielectric material may be different than an index-thickness of other coating layers of low index dielectric material and an index-thickness of each coating layer of high index dielectric material may be different than an index-thickness of other coating layers of high index dielectric material. The index-thicknesses of coating layers of low index dielectric material may be different than the index-thicknesses of coating layers of high index dielectric material. The multilayer photonic structure has a first high reflectivity bandwidth, a second high reflectivity bandwidth and a low reflectivity bandwidth for electromagnetic radiation incident on a surface of the multilayer photonic structure from 0 degrees to 45 degrees, wherein the low reflectivity bandwidth is positioned between the first high reflectivity bandwidth and the second high reflectivity bandwidth.

These and additional features provided by the embodiments of the present invention will be more fully understood in view of the following detailed description, in conjunction with the drawings.

BRIEF DESCRIPTION OF THE DRAWINGS

The embodiments set forth in the drawings are illustrative and exemplary in nature and not intended to limit the inventions defined by the claims. The following detailed description of the illustrative embodiments can be understood when read in conjunction with the following drawings, where like structure is indicated with like reference numerals and in which:

DETAILED DESCRIPTION

Figure 2:
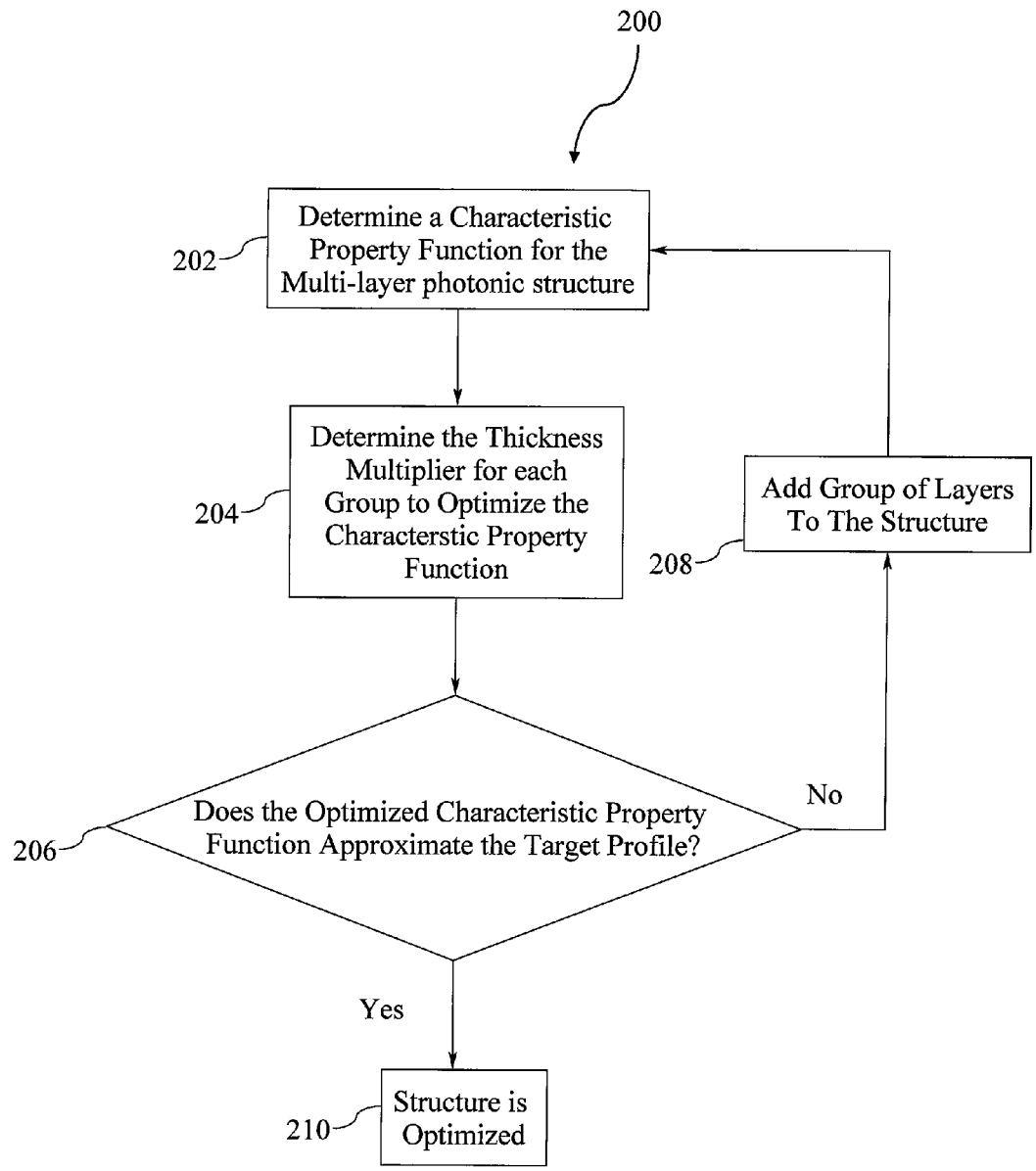
FIG. 2 depicts a flow diagram of a method for producing a multilayer photonic structure according to one or more embodiments shown and described herein.

FIG. 2 generally depicts a flow diagram of one embodiment of a method for designing an omni-directional, multilayer photonic structure to achieve a target characteristic property such as reflectance. The method may include selecting a target profile for the characteristic property as a function of the wavelength of light incident on the multilayer photonic structure. A basic layer structure for the multilayer photonic structure is also selected. The thickness of each layer of the basic layer structure may be expressed as a function of a wavelength of light incident on the structure, the index of refraction of the layer, and a thickness multiplier. A characteristic property function of the basic layer structure for a given angle of incident light may be determined as a function of the wavelength of incident light and the thickness multiplier. The thickness multiplier and, therefore, the thickness of each layer of the basic structure, may be determined by fitting the characteristic property function to the target profile. Methods for producing an omni-directional multilayer photonic structure, and multilayer photonic structures produced thereby, will be described in more detail herein.

In describing the method for designing omni-directional multilayer photonic structures, reference will be made to electromagnetic radiation incident on the multilayer photonic structure. It will be understood that the term "electromagnetic radiation" may be used interchangeably with the term "light" and that both terms refer to various wavelengths of the electromagnetic spectrum, particularly wavelengths in the ultraviolet (UV), infrared (IR), and visible portions of the electromagnetic spectrum.

Figure 1:
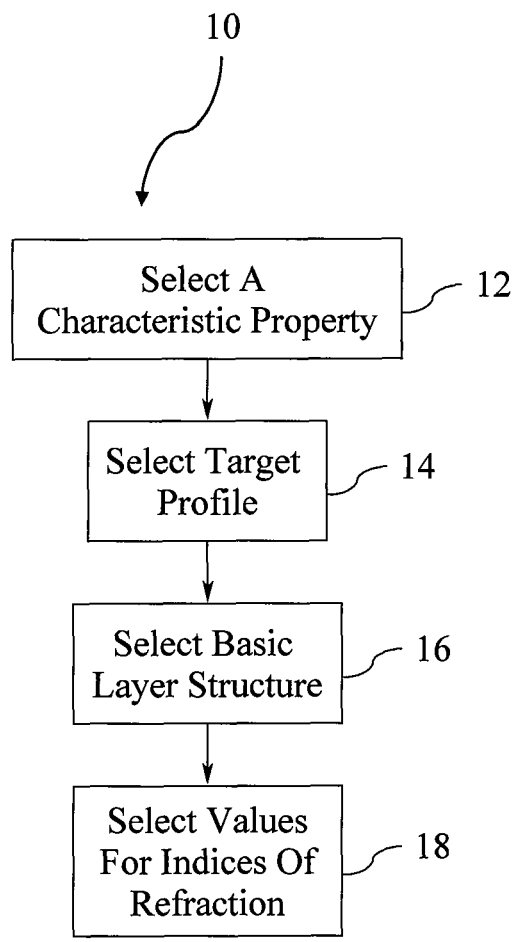
FIG. 1 depicts a flow diagram of preliminary steps for producing a multilayer photonic structure according to one or more embodiments shown and described herein.

Referring now to FIG. 1, a flow diagram 10 of the preliminary steps for designing a multilayer photonic structure having omni-directional properties is illustrated. While the steps listed in the flow diagram 10 are set out and described in a specific sequence, it should be understood that the order in which the preliminary steps are performed may be varied.

In one embodiment, the method of designing a multilayer photonic structure having omni-directional properties may include a preliminary step 12 of selecting a characteristic property for the multilayer structure. In the embodiments described herein, the characteristic property is the reflectance of the multilayer photonic structure. Reflectance, as used herein, refers to the fraction or percentage of light incident on the multilayer photonic structure which is reflected by the multilayer photonic structure and may be plotted as a function of the wavelength of light incident on the structure.

While specific embodiments of the methods for designing multilayer photonic structures described herein utilize reflectance as the characteristic property to be optimized, it should be understood that the methods described herein may, in the alternative, utilize the transmittance or absorptance as the characteristic property to be optimized. Transmittance, as used herein, refers to the fraction or percentage of light incident on the multilayer photonic structure which is transmitted or passed through the multilayer photonic structure and may be plotted as a function of the wavelength of light incident on the structure. Absorptance, as used herein, refers to the fraction or percentage of light incident on the multilayer photonic structure which is neither reflected nor transmitted and may be determined from the reflectance and the transmittance.

Figure 5:
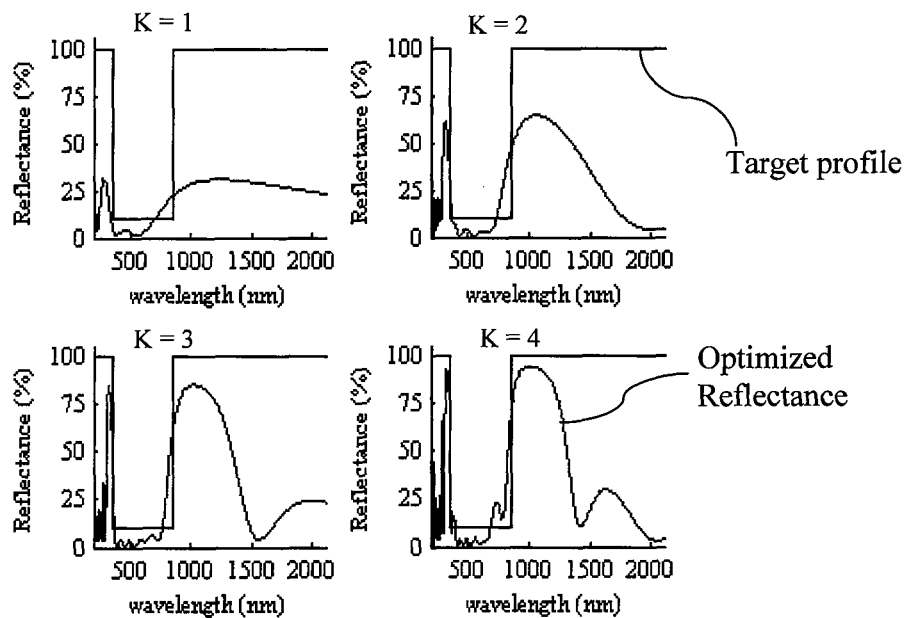
FIG. 5 graphically illustrates the reflectance as a function of wavelength for light having an angle of incidence of 0° on a multilayer photonic structure having 1, 2, 3, and 4 multilayer groups according, to one or more embodiments described herein.
Figure 6A:
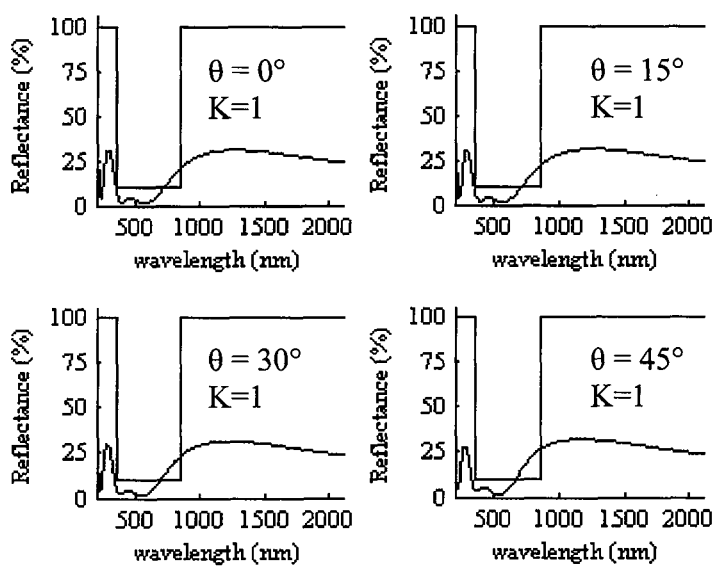
FIGS. 6A-6D graphically illustrate the reflectance as a function of wavelength for light having an angle of incidence of 0°, 15°, 30° and 45° for multilayer photonic structures having 1, 2, 3 and 4 multilayer groups.
Figure 6B:
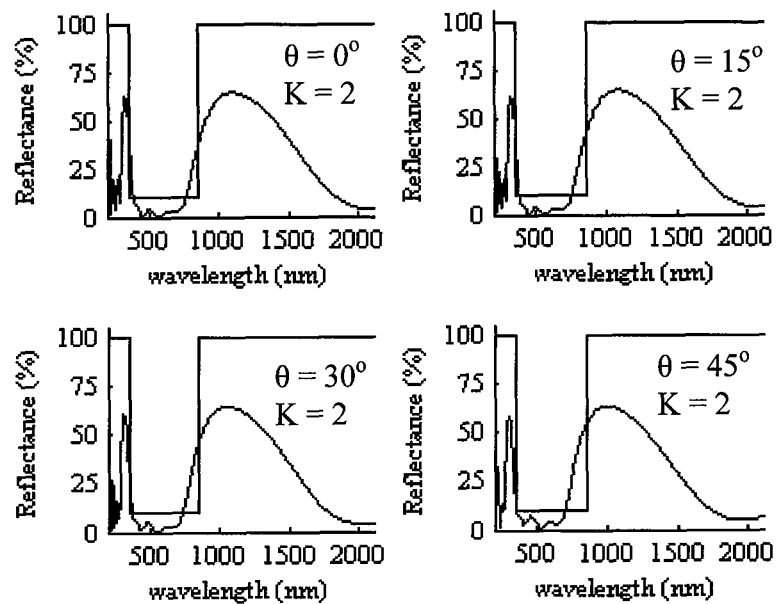
Figure 6C:
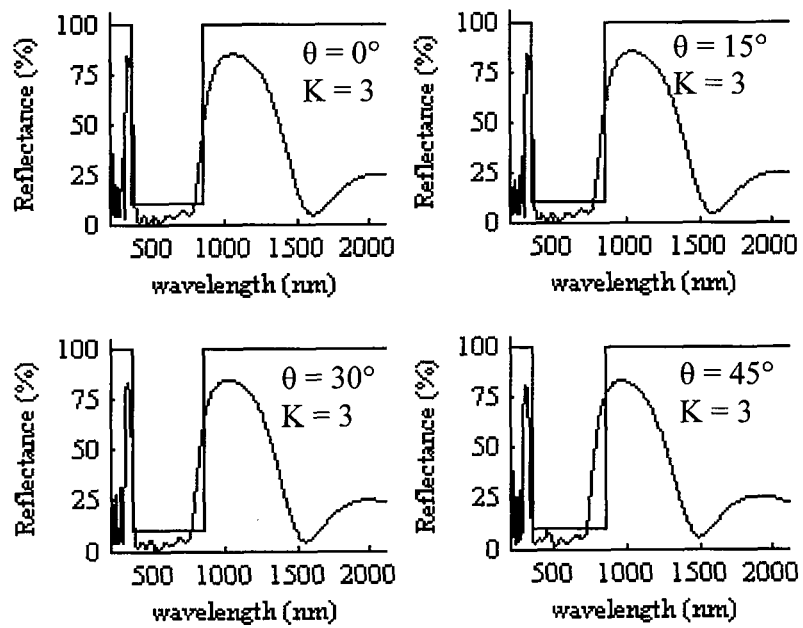
Figure 6D:
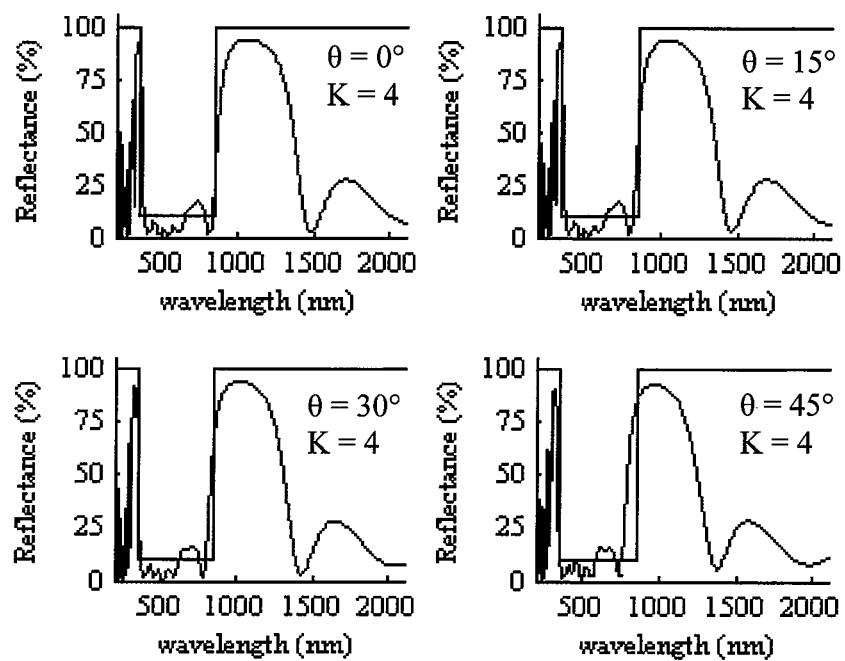

In another preliminary step 14, a target profile for the characteristic property is selected. In the embodiments described herein where the characteristic property is the reflectance of the multilayer photonic structure, a target reflectance profile may be selected such that the optimized multilayer photonic structure has certain reflectance characteristics. For example, in one embodiment, the target reflectance profile may be a square-well reflectance profile such that the optimized multilayer photonic structure reflects UV and IR light while being transparent to visible light. More specifically, the square-well reflectance profile may have 100% reflectance for wavelengths from about 200 nm to about 350 nm (e.g., wavelengths of light in the UV portion of the electromagnetic spectrum), 10% reflectance for wavelengths from about 350 nm to about 850 nm (e.g., wavelengths in the visible portion of the electromagnetic spectrum), and 100% reflectance for wavelengths from about 850 nm to about 2100 nm (e.g., wavelengths in the IR portion of the electromagnetic spectrum), as shown in FIG. 5.

While the target profile described hereinabove is a target reflectance profile having a square-well shape, it should be understood that other target profiles having different shapes may be utilized. For example, the target profile may be a curve or any other suitable shape for achieving a desired reflectance in the optimized multilayer photonic structure. Further, while the target profile described hereinabove is a target reflectance profile, it should be understood that the target profile may also be a target transmittance profile or a target absorption profile.

Another preliminary step 16 may comprise selecting a basic layer structure for the multilayer photonic structure. The multilayer photonic structures described herein generally comprise layers of material with a relatively high refractive index $n_H$ (e.g., high index material) and layers of material with a relatively low refractive index $n_L$ (e.g., low index material) alternately arranged.

Figure 3:
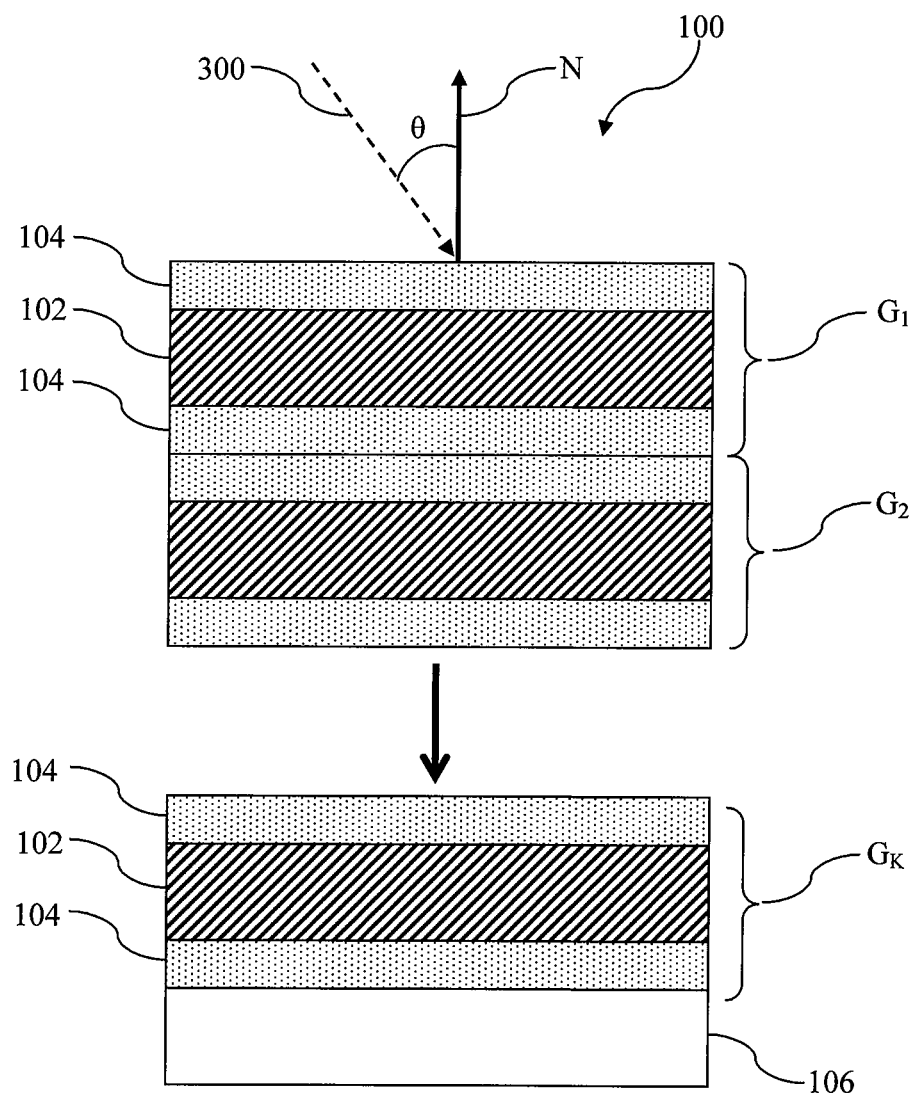
FIG. 3 depicts a multilayer photonic structure for use in conjunction with the method for producing a multilayer photonic structure according to one or more embodiments shown and described herein.

Referring to FIG. 3, in one embodiment, where the target profile is a target reflectance profile with a square-well shape, as described above, the basic layer structure of the multilayer photonic structure 100 may comprise one or more groups of layers $G_K$. Each group of layers $G_K$ may comprise alternating layers of high and low index materials. For example, a group of layers $G_K$ may comprise a single layer of high index material 102 disposed between two layers of low index material 104. As will be described in more detail herein, the multilayer photonic structure 100 may comprise a single group of layers (e.g., K=1) or, in the alternative, multiple groups of layers, in order to achieve the desired target profile. The multilayer photonic structure may be deposited on a substrate 106 which may include glass, polymeric materials, ceramic materials, metallic materials, composite materials and/or various combinations thereof.

In the embodiment shown in FIG. 3, each group of layers $G_K$ may be described by the general form:

$$[0.5m_K L m_K H 0.5 m_K L]$$

where L represents a layer of low index material having a thickness $D_L$, H represents a layer of high index material having a thickness $D_H$, and $m_K$ is a thickness multiplier applied to the group $G_K$. Accordingly, the multilayer photonic structure 100 may have the general form:

$$[(0.5m_K L m_K H 0.5 m_K L)^K]$$

where K is an integer $\geq 1$ which represents the number of groups of layers $G_K$ in the designed multilayer photonic structure 100.

In the embodiment of the multilayer photonic structure shown in FIG. 3, the structure may be a non-quarter wave stack where the thickness $D_L$ of each layer of low index material 104 in a group of layers $G_K$ may be written as:

$$D_L = \frac{m_K \lambda_{ref}}{8 n_L} \quad (1)$$

where $n_L$ is the index of refraction of the low index material, $\lambda_{ref}$ is a reference wavelength of light incidence on the coating and $m_K$ is a thickness multiplier for the group, as described above. Similarly, the thickness $D_H$ of each layer of high index material 102 in a group $G_K$ may be written as:

$$D_H = \frac{m_K \lambda_{ref}}{4 n_H} \quad (2)$$

where $n_H$ is the index of refraction of the high index material, $\lambda_{ref}$ is a reference wavelength of light incidence on the coating and $m_K$ is a thickness multiplier for the group, as described above.

While FIG. 3 depicts one embodiment of the basic layer structure for a multilayer photonic structure 100, it should be understood that other structures may be utilized. For example, the multilayer photonic structure may have a different arrangement of layers and/or layer thicknesses. Further, it will be understood that the method described herein for producing multilayer photonic structures may be utilized in conjunction with such other structures.

Referring again to FIG. 1, in another preliminary step 18, values for the index of refraction $n_H$ of the high index material and the index of refraction $n_L$ of the low index material may be selected. In one embodiment, the values for $n_L$ and $n_H$ are selected such that the values are the same as commonly available materials. For example, the value of $n_L$ may be selected to be 1.5 while the value for $n_H$ may be selected to be 2.5 such that the values of $n_L$ and $n_H$ approximate the indices of refraction for silica ($SiO_2$, index of refraction 1.46) and anatase ($TiO_2$, index of refraction 2.49), respectively. Accordingly, a multilayer photonic structure design which utilizes 1.5 and 2.5 for $n_L$ and $n_H$, respectively, may be constructed from silica and anatase or other materials having the same or similar indices of refraction. It should be understood that other values for $n_L$ and $n_H$ may be selected which correspond to the indices of refraction of other materials. Table 1, shown below, contains a non-exclusive list of possible materials and their corresponding indices of refraction which may be utilized in the multilayer photonic structures described herein.

TABLE 1

| Material | Index of Refraction (visible spectrum) |
| --- | --- |
| Germanium (Ge) | 4.0-5.0 |
| Tellurium (Te) | 4.6 |
| Gallium Antimonite (GaSb) | 4.5-5.0 |
| Indium Arsenide (InAs) | 4.0 |
| Silicon (Si) | 3.7 |
| Indium Phosphate (InP) | 3.5 |
| Gallium Arsenate (GaAs) | 3.53 |
| Gallium Phosphate (GaP) | 3.31 |
| Vanadium (V) | 3 |
| Arsenic Selenide ($As_2Se_3$) | 2.8 |
| $CuAlSe_2$ | 2.75 |
| Zinc Selenide (ZnSe) | 2.5-2.6 |
| Titanium Dioxide ($TiO_2$)-solgel | 2.36 |
| Alumina Oxide (Al2O3) | 1.75 |
| Yttrium Oxide (Y2O3) | 1.75 |
| Polystyrene | 1.6 |
| Magnesium Fluoride (MgF2) | 1.37 |
| Lead Fluoride (PbF2) | 1.6 |
| Potassium Fluoride (KF) | 1.5 |
| Polyethylene (PE) | 1.5 |
| Barium Fluoride (BaF2) | 1.5 |
| Silica (SiO2) | 1.5 |
| PMMA | 1.5 |
| Aluminum Arsenate (AlAs) | 1.56 |
| Solgel Silica (SiO2) | 1.47 |
| N,N' bis(1naphthyl)-4,4'Diamine (NPB) | 1.7 |
| Polyamide-imide (PEI) | 1.6 |
| Chromium (Cr) | 3.0 |
| Tin Sulfide (SnS) | 2.6 |
| Low Porous Si | 2.56 |
| Chalcogenide glass | 2.6 |
| Cerium Oxide ($CeO_2$) | 2.53 |
| Tungsten (W) | 2.5 |
| Gallium Nitride (GaN) | 2.5 |
| Manganese (Mn) | 2.5 |
| Niobium Oxie ($Nb_2O_3$) | 2.4 |
| Zinc Telluride (ZnTe) | 3.0 |
| Chalcogenide glass + Ag | 3.0 |
| Zinc Sulfate (ZnSe) | 2.5-3.0 |
| Titanium Dioxide ($TiO_2$)-vacuum deposited | 2.43 |
| Sodium Aluminum Fluoride (Na3AlF6) | 1.6 |

TABLE 1-continued

| Material | Index of Refraction (visible spectrum) |
| --- | --- |
| Polyether Sulfone (PES) | 1.55 |
| High Porous Si | 1.5 |
| Indium Tin Oxide nanorods (ITO) | 1.46 |
| Lithium Fluoride (LiF4) | 1.45 |
| Calcium Fluoride | 1.43 |
| Strontium Fluoride (SrF2) | 1.43 |
| Lithium Fluoride (LiF) | 1.39 |
| PKFE | 1.6 |
| Sodium Flouride (NaF) | 1.3 |
| Nano-porous Silica (SiO2) | 1.23 |
| Sputtered Silica (SiO2) | 1.47 |
| Vacuum Deposited Silica (SiO2) | 1.46 |
| Hafnium Oxide | 1.9-2.0 |

In addition to values for $n_L$ and $n_H$, values for the indices of refraction for the substrate $n_{substrate}$ on which the multilayer photonic structure is deposited and the incidence material $n_0$ (e.g., the index of refraction of the medium directly adjacent to the upper-most or final layer of the structure) may also be assigned. For example, when the optimized multilayer photonic structure will be deposited on glass, $n_{substrate}$ is about 1.52. When the medium directly adjacent the upper-most layer of the structure is air, $n_0$ is about 1.0. It should be understood that the values for $n_{substrate}$ and $n_0$ may vary according to the specific substrates and environments in which the multilayer photonic structure is used.

Turning now to FIG. 2, a flow diagram is depicted of the method 200 for producing a multilayer photonic structure. For purposes of illustration, the various steps of the method 200 for producing a multilayer photonic structure will be described with specific reference to a multilayer photonic structure which reflects UV and IR light but is transparent to (or transmits) visible light, as described above. This multilayer photonic structure may be referred to herein as a "UV-IR reflector." Accordingly, in the preliminary steps described above, the characteristic target property is the reflectance of the multilayer photonic structure, the target profile is a target reflectance profile having a square-well shape, and the basic layer structure of the multilayer photonic structure is a three layer structure having the form [0.5 $m_K$L $m_K$H 0.5 $m_K$L], as described above. However, it should be understood that the method described herein may be used in conjunction with various other target profiles, basic layer structures and characteristic properties.

In a first step 202, characteristic property function is determined for the multilayer photonic structure. Characteristic property function, as used herein, is defined as a function describing a particular characteristic property of the multilayer photonic structure such as, for example, the reflectance or transmittance. In the example described herein, the characteristic property is the reflectance of the multilayer photonic structure. The characteristic property function may be determined as a function of the thickness multiplier $m_K$ of each group of layers $G_K$ in the structure over a range of wavelengths of interest. The characteristic property function may be initially determined for a single group of layers $G_K$ having the basic layer structure and, thereafter, additional layers may be added to the structure to further optimize the characteristic property.

In one embodiment, when the characteristic property is the reflectance, the characteristic property function is the reflectance of the multilayer photonic structure and may be determined using a transfer matrix method where the reflectance of the multilayer structure is dependent on: the angle of light incident on the coating (e.g., the angle of incidence), the degree of polarization, the wavelength(s) of interest, the thicknesses of each layer of the multilayer photonic structure and the indices of refraction of the high and low index materials, the transmission medium, and the incidence medium. The transfer matrix method will now be described in more detail.

The "matrix method" refers to a methodology for calculating the reflectance and transmittance of a photonic structure using matrix algebra as described in the Ph.D. thesis entitled "Fundamental Studies of Polyelectrolyte Multilayer Films: Optical Mechanical and Lithographic Property Control" by Adam John Nolte (Massachusetts Institute of Technology, 2007). However, it should be understood that other methods for calculating the reflectance and the transmittance of a photonic structure may be used. The propagation of light in a multilayer photonic structure may be understood by examining the defraction of light in each layer of the structure.

The symbol "j" used herein refers to a single layer of a photonic structure having an index of refraction and thickness of $n_j$ and $d_j$ respectively. For a photonic structure comprising J distinguishable layers, there are J+1 interfaces in the structure. For purposes of describing the transfer matrix method, the incidence medium (e.g., the medium adjacent to the upper-most layer of the structure) is labeled with a subscript of "0", and the substrate medium on which the photonic structure is deposited with a subscript of "J+1". For example, the incidence medium has an index of refraction $n_0$ while the substrate layer has an index of refraction $n_{J+1}$. Inside a layer j, electro-magnetic radiation undergoes a shift in phase of $i \cdot \delta_j$ such that:

$$\delta_j = \frac{2\pi \cdot n_j \cdot d_j \cdot \cos\theta_j}{\lambda} \quad (3)$$

where $\lambda$ is the wavelength of the incident light, $\theta_j$ is the angle of refraction in layer j, which by Snell's Law is given by:

$$n_0 \sin\theta_0 = n_j \sin\theta_j \quad (4)$$

where, by the notation introduced above, $n_0$ and $\theta_0$ are the refractive index and angle of incidence in the incident medium. Referring to FIG. 3, the angle of incidence, as used herein, is the angle between a ray of incident light 300 and a normal N to the uppermost surface of the multilayer photonic structure. It will be understood that Equation (4) may be solved for $\theta_j$ such that $\theta_j$ is a function of the angle of incidence $\theta_0$ of light on the layer.

The light incident on the layer comprises an electric field component and a magnetic field component. Accordingly, the magnitudes of the total electric (E) and magnetic (H) field for the transverse electric polarization (TE) and the transverse magnetic polarization (™) at each interface in the structure may be written as:

$$E_{j \cdot TE} = E_j^+ + E_j^- \quad (5)$$

$$H_{j \cdot TE} = \eta_{j \cdot TE} \cdot (E_j^+ - E_j^-) \quad (6)$$

$$E_{j \cdot TM} = (E_j^+ - E_j^-) \cdot \cos(\theta_j) \quad (7)$$

$$H_{j \cdot TM} = \eta_{j \cdot TM} (E_j^+ - E_j^-) \cdot \cos(\theta_j) \quad (8)$$

where the particular form of $\eta_j$, the optical admittance, depends upon the polarization:

$$\eta_{j,TE} = \sqrt{\frac{\varepsilon_0}{\mu_0}} \cdot n_j \cdot \cos\theta_j \text{ (for TE polarized radiation)} \quad (9)$$

$$\eta_{j,TM} = \sqrt{\frac{\varepsilon_0}{\mu_0}} \cdot n_j / \cos\theta_j \text{ (for TM polarized radiation).} \quad (10)$$

$\varepsilon_0$ and $\mu_0$ are the permittivity and permeability of a vacuum, respectively, where $$\mu_0 = 4\pi \cdot 10^{-7} \frac{H}{m} \text{ and } \varepsilon_0 = \frac{1}{c^2 \cdot \mu_0} \approx 8.85 \cdot 10^{-12} \frac{F}{m}$$

where c is the speed of light in a vacuum.

Equations (3)-(10) may be rewritten in a matrix that relates the electric and magnetic fields at interfaces j and j+1 in terms of the properties of layer j:

$$\begin{bmatrix} E_j \\ H_j \end{bmatrix} = \begin{bmatrix} \cos\delta_j & \frac{i \cdot \sin\delta_j}{\eta_j} \\ i \cdot n_j \cdot \sin\delta_j & \cos\delta_j \end{bmatrix} \begin{bmatrix} E_{j+1} \\ H_{j+1} \end{bmatrix} = M_j \begin{bmatrix} E_{j+1} \\ H_{j+1} \end{bmatrix} \quad (11)$$

where $M_j$ is known as the characteristic matrix of a particular layer j. A total transfer matrix ($M_T$), also called a characteristic matrix, for the entire multilayer photonic structure, may be obtained by multiplying the characteristic matrices for each individual layer in the multilayer photonic structure such that:

$$M_T = M_1 \cdot M_2 \cdots M_J = \prod_{j=1}^{J} M_j = \begin{bmatrix} m_{11} & m_{12} \\ m_{21} & m_{22} \end{bmatrix} \quad (12)$$

and, $$\begin{bmatrix} E_0 \\ H_0 \end{bmatrix} = M_T \begin{bmatrix} E_{J+1} \\ H_{J+1} \end{bmatrix} \quad (13)$$

The amplitude reflection (r) and transmission (t) coefficients can be determined from $M_T$ as follows:

$$r_{TE} = \frac{E_0^-}{E_0^+} = \frac{\eta_{0,TE} m_{11} + \eta_{0,TE}\eta_{J+1,TE} m_{12} - m_{21} - \eta_{J+1,TE} m_{22}}{\eta_{0,TE} m_{11} + \eta_{0,TE}\eta_{J+1,TE} m_{12} + m_{21} + \eta_{J+1,TE} m_{22}} \quad (14)$$

$$t_{TE} = \frac{E_{J+1}^+}{E_0^+} = \frac{2\eta_{0,TE}}{\eta_{0,TE} m_{11} + \eta_{0,TE}\eta_{J+1,TE} m_{12} + m_{21} + \eta_{J+1,TE} m_{22}} \quad (15)$$

$$r_{TM} = \frac{\eta_{0,TM} m_{11} + \eta_{0,TM}\eta_{J+1,TM} m_{12} - m_{21} - \eta_{J+1,TM} m_{22}}{\eta_{0,TM} m_{11} + \eta_{0,TM}\eta_{J+1,TM} m_{12} + m_{21} + \eta_{J+1,TM} m_{22}} \quad (16)$$

$$t_{TM} = \frac{2\eta_{0,TM}}{\eta_{0,TM} m_{11} + \eta_{0,TM}\eta_{J+TM} m_{12} + m_{21} + \eta_{J+1,TM} m_{22}} \cdot \frac{\cos(\theta_0)}{\cos(\theta_s)} \quad (17)$$

from which the reflectance (R) and transmittance (T), which are the actual fractions of light reflected and transmitted by the multilayer photonic structure, respectively may be calculated. Specifically:

$$R = r \cdot r* \quad (18)$$

$$T = t \cdot t* \cdot \frac{\Re(n_s) \cdot \cos[\Re(\theta_s)]}{\Re(n_0) \cdot \cos[\Re(\theta_0)]}. \quad (19)$$

$$A = 1 - R - T \quad (20)$$

The variable "A" refers to the absorptance of the multilayer photonic structure, which, as described above, is the fraction of the incident power that is absorbed by the structure and not reflected or transmitted. It should be understood that equations (3)-(20) may be implemented with a computer comprising software programmed to receive various inputs from a user related to the properties of a particular multilayer photonic structure and determine function(s) for the reflectance R, the transmittance T and/or the absorptance A. Such software may be referred to as a photonics calculator.

As noted above, the transfer matrix method may be used to determine both the reflectance and the transmittance of the multilayer photonic structure. Accordingly, while specific examples used herein describe determining the reflectance for a specific multilayer photonic structure (e.g., the UV-IR reflector) using the transfer matrix method, it should be understood that the transfer matrix method may also be used to determine the transmittance of the structure and that the method described herein may also be utilized to optimize the transmittance.

By way of example, for a UV-IR reflector as described above, the thickness $d_j$ of each layer of the multilayer photonic structure is defined by Equations (1) and (2) where the reference wavelength $\lambda_{ref}$ is 550 nm and $n_L$ and $n_H$ are 1.5 and 2.5, respectively. Accordingly, $\delta_j$ in Equation (3) may be written as a function of the thickness multiplier $m_K$ for each group $G_K$ of layers. Similarly, the index of refraction $n_j$ of each layer in the multilayer photonic structure may be either 1.5 or 2.5 depending on whether the layer comprises high index material or low index material. The incidence medium may be air such that $n_0$ is 1 and the substrate medium is glass such that $n_{J+1}$ is 1.52. For this example, the incident light is natural, white light having equal contributions of TE and TM modes such that the degree of polarization is 0.5. The light incident on the coating may have a wavelength $\lambda$ from about 200 nm to about 2100 nm. The angle of incidence $\theta_0$ of the light is initially set to 0°. Based on these exemplary conditions, the reflectance R of the multilayer photonic structure is dependent on the wavelength of light incident on the multilayer photonic structure and the thickness multiplier $m_K$ for each group of layers $G_K$ in the structure. An equation or system of equations for determining the reflectance and/or transmittance of the multilayer photonic structure may be determined using the transfer matrix method, described above, in conjunction with a photonics calculator.

In a next step 204, the thickness multiplier $m_K$ for each group of layers $G_K$ is optimized such that the multilayer photonic structure has a specific property. For example, the UV-IR reflector described herein may be optimized such that the UV-IR reflector reflects a certain percentage of light at a specific wavelength while reflecting a different amount of light at another wavelength. In order to optimize the thickness multiplier $m_K$, the characteristic property function may be compared to a target profile. In the example of the UV-IR reflector described herein, the characteristic property function is the reflectance R and the target profile is a target reflectance profile. As described above, to produce a UV-IR reflector, the target reflectance profile may have a square-well shape such that the reflectance of the corresponding structure is 100% for UV and IR wavelengths while the reflectance in the visible spectrum is less than 100%.

The value of the thickness multiplier $m_K$ may be determined by curve fitting the equation for the reflectance R, as determined through the transfer matrix method, to the target reflectance profile. Specifically, the reflectance R may be fit to the target reflectance profile by adjusting the thickness of the layers in each group of layers $G_K$ in the multilayered photonic structure. This may be accomplished by adjusting the value of the thickness multiplier $m_K$ for each group of layers $G_K$. Accordingly, the optimization or curve fitting process yields values for the thickness multiplier $m_K$ such that the characteristic property function, in this case the reflectance R, approximates the target profile.

In one embodiment, values for $m_K$ may be determined by fitting the characteristic property function to the target profile using a non-linear curve fitting algorithm. In one embodiment, the non-linear curve fitting algorithm may solve a function through the minimization of the sum of the squared difference of a given function containing a vector of variables (e.g., the reflectance R) and a set of target coordinates (e.g., the target reflectance profile). For example, the minimization of the sum of squares difference may have the form:

$$\min \Sigma (F(x,y) - F(x, y_{Target}))^2$$

where $F(x,y)$ is the reflectance R and $F(x, y_{Target})$ is the target reflectance profile. The non-linear curve fitting algorithm described herein may be implemented with a computer system comprising software programmed to perform the non-linear curve fitting algorithm. In one embodiment, the curve fitting algorithm may be a part of the same software package as the photonics calculator described above. Accordingly, it will be understood that the software package may be operable to: receive inputs from a user related to the various parameters of a multilayer photonic structure; receive a target profile input by a user; determine a characteristic property function for the multilayer photonic structure based on the received inputs; and fit the characteristic property function to the received target profile thereby determining a thickness multiplier for a group of layers of the multilayer photonic structure. Alternatively, a suitable curve fitting algorithm which may be employed for determining values for $m_K$ may be the LSQCURVEFIT function of the Optimization Toolbox™ of the software package Matlab®. The equation for the reflectance R and the target reflectance profile may be imported into the software and solved for values of $m_K$ over a range of wavelengths from about 200 nm to about 2100 nm such that the reflectance R approximates the target reflectance profile. For example, Table 2, shown below, is indicative of values of thickness multipliers $m_K$ for K=1, 2, 3, and 4 which, in turn, corresponds to multilayer photonic structures having 1, 2, 3 and 4 groups of layers. The values of $m_K$ in Table 2 were calculated utilizing the minimization of the sum of the squared difference algorithm for light having an angle of incidence $\theta_0$ of 0°.

TABLE 2

| K | $m_1$ | $m_2$ | $m_3$ | $m_4$ |
|---|---|---|---|---|
| 1 | 1.6749 | — | — | — |
| 2 | 1.7472 | 1.8290 | — | — |
| 3 | 1.7646 | 1.8291 | 1.7600 | — |
| 4 | 1.7638 | 1.9536 | 1.7475 | 1.7167 |

While the aforementioned curve fitting technique references the use of the sum of the squared difference algorithm, its should be understood that various other non-linear curve fitting techniques may be used in order to fit the reflectance R to the target reflectance profile and thereby determine the thickness multipliers $m_K$ for each group of layer $G_K$ in the multilayer photonic structure.

Figure 4:
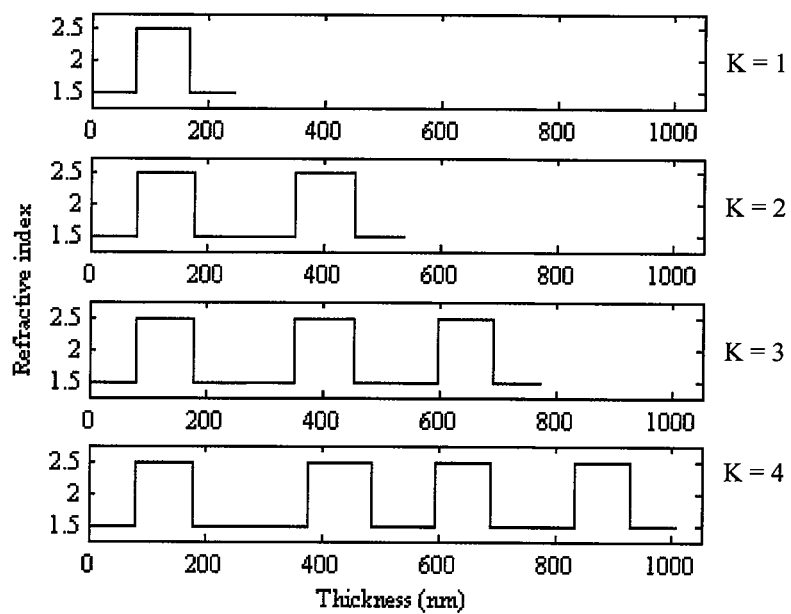
FIG. 4 graphically illustrates the thickness of each layer of a multilayer photonic structure comprising 1, 2, 3 and 4 multilayer groups, wherein each group comprises alternating layers of low index and high index materials, according to one or more embodiments shown and described herein.

Referring now to FIG. 4, a series of plots depicting the layer thickness ($D_L$, $D_H$) vs. the index of refraction of the layer are shown for the UV-IR reflector having multilayer structures with 1, 2, 3 and 4 groups of layers $G_K$ (e.g., K=1, 2, 3, 4). The thickness of each layer of the UV-IR reflector was calculated utilizing Equations (1) and (2) and the values for $m_K$ from Table 2.

Referring again to FIG. 2, in step 206, the characteristic property function may be adjusted or optimized by incorporating the thickness multiplier into the previously determined characteristic property function. For example, the thickness multiplier may be incorporated into Equation (3) above, such as when the values of $D_L$ and $D_H$ are a function of the thickness multiplier. The adjusted or optimized characteristic property function is then compared to the target profile to determine if the optimized characteristic property function approximates the target profile. For example, for the UV-IR reflector, the optimized reflectance (e.g., the reflectance incorporating the thickness multipliers $m_K$ determined in step 204) may be plotted as a function of wavelength on the same axes as the square-well target reflectance profile to determine if the optimized reflectance approximates the target reflectance profile. For example, the UV-IR reflector example described herein, the reflectance approximates the target reflectance profile when the reflectance in the visible range is less than about 30% and the reflectance in the UV and near IR range is greater than about 90% of the target reflectance. It will be understood that the degree of approximation may vary depending on the desired properties of the resulting omnidirectional multilayer photonic structure.

Referring now to FIG. 5 by way of example, after values for $m_K$ have been determined for each group of layers $G_K$ in the multilayer photonic structure, the reflectance of the structure may be plotted as a function of the wavelength of light incident on the multilayer photonic structure. FIG. 5 shows the target reflectance profile, in this case the square-well reflectance profile described above, plotted on the same axes as the optimized reflectance. As shown in FIG. 5, when the multilayer photonic structure comprises a single group of layers (e.g., K=1), the optimized reflectance does not closely approximate the target reflectance profile. However, as the number of groups of layers in the multilayer structure is increased, (e.g., K=2, 3, 4), the optimized reflectance more closely approximates the target reflectance profile.

Referring again to FIG. 2, if the degree of approximation between the reflectance and the target reflectance profile is determined to be insufficient in step 206, the method 200 proceeds to step 208. In step 208, one or more additional groups of layers $G_K$ may be added to the multilayer photonic structure. As noted above and graphically illustrated in FIG. 5, the addition of groups of layers $G_K$ to the multilayer photonic structure may further optimize the multilayer photonic structure such that the optimized reflectance more closely approximates the target reflectance profile. For the specific example of the UV-IR reflector, it has been determined that four groups of layers (e.g., K=4) sufficiently approximates the target reflectance profile.

After additional groups of layers $G_K$ are added to the multilayer photonic structure, steps 202 and 204 are repeated for the entire multilayer photonic structure. For example, if the multilayer photonic structure initially comprised one group of layers (e.g., K=1) and a second group of layers was added to the structure in step 208 such that K=2, steps 202 and 204 are repeated such that the thickness multipliers $m_1$ and $m_2$ for groups $G_1$ and $G_2$, respectively, are determined. It should be noted that the addition of groups of layers to existing groups of layers requires that any previously determined thickness multipliers $m_K$ be re-determined in order to optimize the characteristic property function for the multilayer photonic structure. For example, Table 2 shows that each additional group of layers added to the structure causes a change in the thickness multiplier for each previous group of layers.

The method 200 loops from step 206 to step 202 and additional groups of layers are added to the multilayer photonic structure until the optimized characteristic property of the multilayer photonic structure approximates the target reflective profile. As noted above, the UV-IR reflector is optimized when the structure comprises four groups of layers. Once the target profile is approximated, the optimization algorithm is complete (e.g., structure is optimized at 210).

As noted hereinabove, the multilayer photonic structure is initially optimized for light having an angle of incidence of 0°. However, in order to tune the multilayer photonic structure such that the characteristic property is optimized for omni-directional properties, such as omni-directional reflectance, the method 200 may be repeated for various other angles of incident light. Omni-directional reflectance, as used herein, refers to light being completely reflected irrespective of the angle of incidence. FIGS. 6A-6D shown below, show the optimized reflectance as a function of wavelength for various values of K (e.g., K=1, 2, 3, and 4) and various angles of incidence (e.g., $\theta_0$=0°, 15°, 30° and 45°). While the data depicted in FIGS. 6A-6D is optimized for angles of incidence from 0° to 45°, it should be understood that the multilayer photonic structures described herein may be further optimized for other angles of incidence from about 0° up to less than about 90°.

Referring now to FIGS. 6A-6D, the modeled reflectance for the UV-IR reflector described herein is shown for various angles of incidence. As shown in FIGS. 6A-6D, increasing the angle of light incident on the coating only minimally effects the optimized reflectance. Specifically, as the angle of incidence is increased, there is a slight shift in the reflectance at higher wavelengths in the direction of lower wavelengths. However, it should be noted that this shift does not result in interference with the visible spectra. Accordingly, FIGS. 6A-6D indicate that the method described herein may be used to effectively "tune" a multilayer photonic structure to achieve omni-directional characteristic properties, specifically omni-directional reflectivity.

After performing the method 200 for various angles of incident light, and thereby determining the thickness multipliers $m_K$ for each group of layers $G_K$ at each angle of incidence, the thickness multipliers may be averaged together. Table 3, shown below, contains the average value for the thickness multipliers $M_{KAVG}$ for the UV-IR reflector described herein such that the UV-IR reflector is tuned for omni-directional reflectivity.

TABLE 3

| K | $m_{1AVG}$ | $m_{2AVG}$ | $m_{3AVG}$ | $m_{4AVG}$ |
|---|---|---|---|---|
| 1 | 1.7210 | — | — | — |
| 2 | 1.8111 | 1.8791 | — | — |
| 3 | 1.8290 | 1.8882 | 1.8168 | — |
| 4 | 1.8621 | 1.8080 | 2.0492 | 1.7078 |

Once the thickness multiplier(s) $m_{KAVG}$ have been determined such that the multilayer photonic structure is optimized for omni-directional properties, the thickness of each layer of the multilayer photonic structure may be calculated utilizing $M_{KAVG}$. For example, for the UV-IR reflector example described herein where the multilayer photonic structure comprises K groups of the form [0.5 $m_K$L $m_K$H 0.5 $m_K$L] such that the multilayer structure has the form [(0.5 $m_K$L $m_K$H 0.5 $m_K$L)$^K$], the thickness $D_L$ of each layer of low index material L and the thickness $D_H$ of each layer of high index material H may be calculated using Equations (1) and (2). As described above, the UV-IR reflector may have layers of low index material and high index material having indices of refraction $n_L$ and $n_H$ of 1.5 and 2.5, respectively, and the reference wavelength $\lambda_{ref}$ is 550 nm. Values for the thickness of each layer in the multilayer photonic structure are shown below in Table 4. The thickness multipliers $m_{KAVG}$ for K=4 were used to calculate the thickness of each layer.

TABLE 4

| K | $m_{KAVG}$ | $D_L$ (nm) | $D_H$ (nm) |
|---|---|---|---|
| 1 | 1.8621 | 85.2842 | 102.4155 |
| 2 | 1.8080 | 82.8064 | 99.44 |
| 3 | 2.0492 | 93.8534 | 112.706 |
| 4 | 1.7078 | 78.2172 | 93.929 |

Once the thickness of each layer in the multilayer photonic structure has been determined, the multilayer photonic structure may be deposited on a substrate such that each layer of the multilayer photonic structure has the proper thickness to achieve the desired omni-directional properties in the multilayer photonic structure. Various material deposition and/or materials processing techniques may be used to deposit the multilayer structure on the substrate including, without limitation, physical vapor deposition, chemical vapor deposition, sol gel processes, electron beam evaporation of alternating layers, vacuum evaporation of alternating layers, thermal evaporation, electrochemical deposition and etching processes, high-vacuum vapor deposition and oxidation processes, sputtering of alternating layers, molecular-beam epitaxy processes, thermal mechanical processing, chemical processing, poly-electrolyte multilayer deposition by 'layer by layer' processing and/or combinations thereof. The aforementioned techniques may be used to deposit the multilayer photonic structures on substrates formed from various material including, without limitation, metals, alloys, polymers, ceramics, glass and combinations thereof.

By way of illustration, the UV-IR reflector described hereinabove may be implemented by depositing layers of high and low index materials to form the multilayer photonic structure 100 depicted in FIG. 3. For example, as described hereinabove, the high index material 102 may comprise a material with an index of refraction $n_H$ of 2.5, such as anatase, while the low index material 104 may comprise a material with an index of refraction $n_L$ of 1.5, such as silica. The high and low index materials may be deposited on a glass substrate ($n_{substrate}$=1.52) in groups of 3 layers where each group has the form [0.5 $m_K$L $m_K$H 0.5 $m_K$L]. As noted herein, the multilayer photonic structure comprises 4 groups of layers such that the overall structure may be written as [(0.5 $m_K$L $m_K$H 0.5 $m_K$L)$^4$]. The thickness of each low index layer L and each high index layer H in each group $G_K$ are shown above in Table 4.

The multilayer photonic structure 100 has been described herein as comprising groups of layers having the form [0.5 $m_K$L $m_K$H 0.5 $m_K$L] where each layer of high index material and each layer of low index material in each group of layers has a specified thickness to achieve a particular target reflectance profile, such as the square-well target reflectance profile graphically depicted in FIGS. 5 and 6. However, when each three layer group is deposited, it should be understood that adjacent layers of similar materials (i.e., adjacent layers of low index materials when the group of layers have the form [0.5 $m_K$L $m_K$H 0.5 $m_K$L]) may be deposited as a single layer which has a thickness which is the sum of the thicknesses of the individual layers. For example, referring to FIG. 1 and Table 4 which describes a photonic structure having four groups of layers with the form [0.5 $m_K$L $m_K$H 0.5 $m_K$L], a group of layers $G_4$ (i.e., $G_K$ in FIG. 1) may be deposited on the substrate 106 (which, in this example, is a quartz glass substrate). The layers of low index material 104 in the group of layers $G_4$ have a thickness of 78.2172 nm while the layer of high index material 102 in the group of layers $G_4$ has a thickness of 93.929 nm. A group of layers $G_3$ may be deposited over the group of layers $G_4$ such that the bottom layer of low index material in the group of layers $G_3$ is directly adjacent the top layer of low index material of the first group of layers $G_4$. The layers of low index material 104 in the group of layers $G_3$ have a thickness of 93.8534 nm and the layer of high index material 102 of the second group of layers $G_3$ is 112.706. Because of their relative orientations, the bottom layer of low index material 104 in the group of layers $G_3$ and the top layer of low index material 104 in the group of layers $G_4$ may be deposited as a single layer having a thickness of 172.0706 nm (i.e., 78.2172 nm+93.8534 nm). Accordingly, a single layer of low index material having a thickness of 172.0706 nm may be deposited between the layer of high index material of the group of layers $G_4$ and the layer of high index material of the group of layers $G_3$. The group of layers $G_2$ may be deposited over the group of layers $G_3$ in a similar manner and the group of layers $G_1$ may be deposited over the group of layers $G_2$ to complete the multilayer photonic structure comprising four groups of layers. To differentiate between the layers of high index and low index materials in the groups $G_K$ and the layers of high index and low index materials actually deposited on the substrate to form the multilayer photonic structures, the layers of high index materials and low index materials actually deposited on the substrate will hereinafter be referred to as coating layers (e.g., the high index coating layers and low index coating layers).

Based on the foregoing example, it should be understood that the multilayer photonic structures described herein comprise alternating coating layers of low index material and high index material having specific thicknesses to achieve a particular target reflectance profile which, in the examples described herein, is a square well profile having a first high reflectivity bandwidth and a second high reflectivity bandwidth separated by a low reflectivity bandwidth as shown in FIGS. 5 and 6. The alternating coating layers of high index material and low index material vary in thickness. More specifically, each high index coating layer has a different thickness than the other high index coating layers and each low index coating layer has a different thickness than the other low index coating layers. Moreover, the low index coating layers have thicknesses which are different than the thicknesses of the high index coating layers. Accordingly, it should be understood that the index-thickness, defined herein as the product of the index of refraction of a coating layer and the thickness of a coating layer, is different for each coating layer of low index material and each coating layer of high index material. Further, it should be understood that the index-thickness of each coating layer of low index material is different than the index-thickness of each coating layer of high index material. For a coating layer of low index material having an index of refraction $n_L$ and thickness $D'_L$ and a coating layer of high index material having an index of refraction $n_H$ and thickness $D'_H$ this may be expressed as:

$$n_L D'_L \neq n_H D'_H.$$

Also, it should be understood that the low index coating layers and the high index coating layers have non-quarter wave thicknesses such that, for any high index coating layer or any low index coating material the index-thicknesses are not equal to one quarter of the reference wavelength. This may be expressed mathematically as:

$$n_L D'_L \neq n_H D'_H \neq \frac{\lambda_{ref}}{4}$$

As described herein, each coating layer of the multilayer photonic structure may have a specific thickness in order to achieve a multilayer photonic structure with a specified reflectance profile. In one embodiment, the thickness of the coating layers (both high index and low index) may be from about 10 nm to about 400 nm. In another embodiment, the thickness of the coating layers may be from about 50 nm to about 200 nm. The particular thickness of each coating layer is dependent on the specific indices of refraction of the low and high index materials, the total number of coating layers in the multilayer photonic structure, the thickness of the other layers in the photonic structure as well as the particular reflectance profile sought.

Further, the multilayer photonic structures described herein have a base layer structure of the form [0.5 $m_K$L $m_K$H 0.5 $m_K$L]. A multilayer photonic structure having this base layer structure generally comprises an odd number coating layers alternating between low index material and high index material. In this embodiment, the multilayer photonic structures are generally arranged such that the first coating layer (i.e., the layer initially deposited on the substrate) and the last coating layer are low index coating layers. Accordingly, it should be understood that the number of low index coating layers in the multilayer photonic structure is greater than the number of high index coating layers by one. For example, if the multilayer photonic structure comprises a total of nine coating layers, the multilayer photonic structure will comprise five low index coating layers and four high index coating layers. In the embodiments described herein where the multilayer photonic structures are based upon a three layer group of layers having the form [0.5 $m_K$L $m_K$H 0.5 $m_K$L], at least two groups of layers (i.e., a total of five coating layers) are used to create a multilayer photonic structure having the desired properties.

Figure 7:
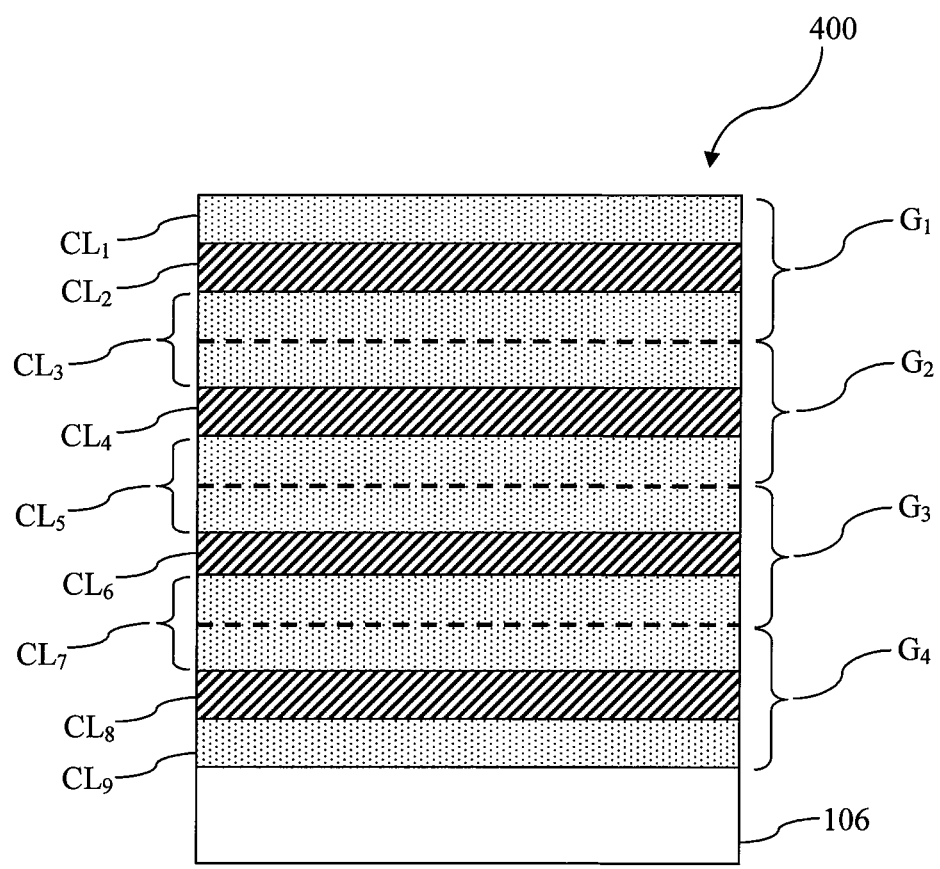
FIG. 7 depicts a multilayer photonic structure comprising nine alternating coating layers of high index and low index material according to one embodiment shown and described herein.
Figure 8:
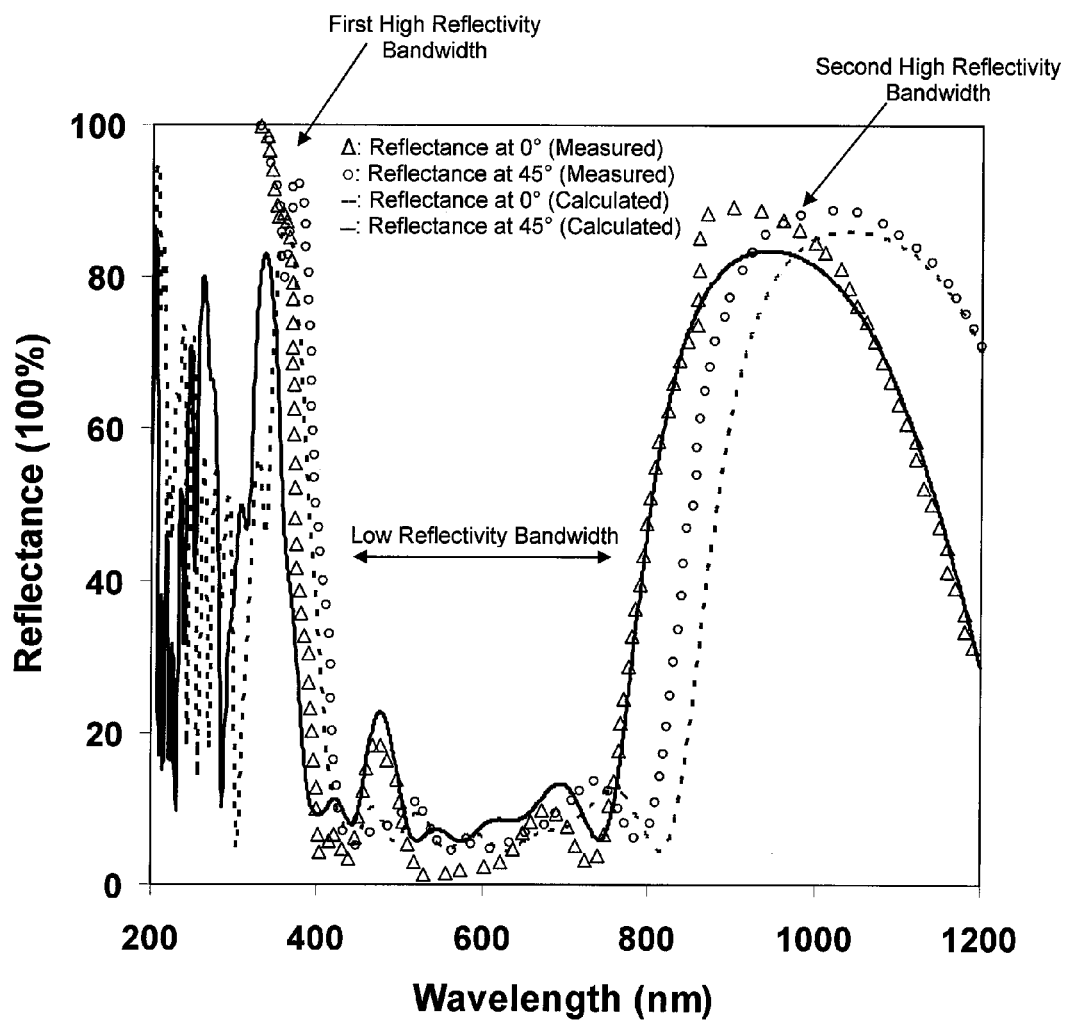
FIG. 8 graphically illustrates the measured reflectance profile of the multilayer photonic structure of FIG. 7 as well as the calculated reflectance profile utilized to design the multilayer photonic structure depicted in FIG. 7.

Referring now to FIGS. 7 and 8, one embodiment of a multilayer photonic structure 400 is schematically illustrated. The multilayer photonic structure was designed to approximate a square well target reflectance profile similar to the profile shown in FIGS. 5 and 6. Accordingly, it should be understood that the target profile was a target reflectance profile. In this embodiment, the multilayer photonic structure 400 comprises a first high reflectivity bandwidth and a second high reflectivity bandwidth separated by a low reflectivity bandwidth, as is graphically illustrated in FIG. 8. In general, the reflectance of wavelengths of electromagnetic radiation in the first high reflectivity bandwidth and the second high reflectivity bandwidth is at least 50% for wavelengths of electromagnetic radiation which fall within each of the bandwidths. However, the reflectance is less than 50% for wavelengths of electromagnetic radiation which fall within the low reflectivity bandwidth.

In the embodiment of the multilayer photonic structure 400 shown in FIG. 7, the multilayer photonic structure 400 is based on a basic layer structure having the form [0.5 $m_K$L $m_K$H 0.5 $m_K$L], as described above. The multilayer photonic structure was designed for a reference wavelength $\lambda_{ref}$ of 550 nm and deposited on a quartz glass substrate having an index of refraction of 1.52 with air being the incidence medium (i.e., $n_0$ is 1). The incident light is natural, white light with a degree of polarization of 0.5. The layers of high index material were formed from titania ($TiO_2$) while the layers of low index material were formed from silica ($SiO_2$). The index of refraction of titania, as deposited, was 2.29 while the index of refraction of silica, as deposited, was 1.46.

While the multilayer photonic structure 400 has been described herein as comprising titania and silica, it should be understood that other materials may be used to form the layers of high index and low index materials. For example, other dielectric materials with similar indices of refraction may be used. Alternatively, the dielectric materials used to form the coating may comprise one or more dopants which increase or decrease the index of refraction of the material such that the index of refraction of the material is as specified. Moreover, it should also be understood that materials with different indices of refraction may be used to achieve the target reflectance profile, in which case the thicknesses of the individual layers may be adjusted accordingly while still achieving the desired reflectance profile.

As noted herein, the embodiment of the multilayer photonic structure depicted in FIG. 7 was designed for a reference wavelength $\lambda_{ref}$ of 550 nm. As a result, the first high reflectivity bandwidth comprises wavelengths of electromagnetic radiation in the ultraviolet portion of the electromagnetic spectrum, the low reflectivity bandwidth comprises wavelengths of electromagnetic radiation in the visible portion of the electromagnetic spectrum, and the second high reflectivity bandwidth comprises wavelengths of electromagnetic radiation in the infrared portion of the electromagnetic spectrum, as illustrated in FIG. 8.

More specifically, the first high reflectivity bandwidth has a reflectance of 50% or greater for electromagnetic radiation with a wavelength less than about 400 nm while the second high reflectivity bandwidth has a reflectance of 80% or greater for electromagnetic radiation with wavelengths greater than about 800 nm. The low reflectivity bandwidth has as reflectance of 20% or less for wavelengths of electromagnetic radiation from about 400 nm to about 800 nm. Based on the foregoing reflectance values, the multilayer photonic structure 400 may be referred to as a UV-IR reflector.

While the embodiment of the multilayer photonic structure 400 shown in FIG. 7 is designed for a reference wavelength $\lambda_{ref}$ of 550 nm, it should be understood that the multilayer photonic structure 400 may be designed for other reference wavelengths and, as such, the first high reflectance bandwidth, the second high reflectance bandwidth and the low reflectance bandwidth may include different wavelengths of electromagnetic radiation. Further, the reflectance within each of the reflectivity bandwidths may be higher or lower depending on the specific target reflectance profile on which the multilayer photonic structure 400 is based.

Using the methodology described hereinabove it was determined that a total of four groups of layers (i.e., K=4) having the form [0.5 $m_K$L $m_K$H 0.5 $m_K$L] could be used to obtain the desired reflectance profile. The thickness multipliers for each group of layers as well as the thickness $D_L$ for each low index layer and the thickness $D_H$ for each high index layer of each group of layers $G_K$ are shown in Table 5. Once the thickness multiplier for each group $G_K$ of layers was determined the thicknesses $D_L$ and $D_H$ were calculated according to Equations (1) and (2). It should be noted that the thickness multiplier $M_{K_{AVG}}$ for each group $G_K$ was determined for angles of incidence of 0°, 15°, 30°, and 45°, as described above. Accordingly, it should be understood that the multilayer photonic structure 400 behaves as an omnidirectional reflector for electromagnetic radiation in the first and second reflectivity bandwidths which have angles of incidence between 0° and 45° relative to the normal to the surface of the multilayer photonic structure.

TABLE 5

| Group (K) | $D_H$ (nm) | $D_L$ (nm) | $m_{K_{AVG}}$ |
| --- | --- | --- | --- |
| 1 | 122.7953 | 96.3018 | 2.045 |
| 2 | 109.7658 | 86.0835 | 1.828 |
| 3 | 110.6184 | 86.7521 | 1.842 |
| 4 | 109.9039 | 86.19178 | 1.8304 |

In order to form the multilayer photonic structure 400 shown in FIG. 7, four groups of layers having the thicknesses specified in Table 5 were deposited on a quartz substrate 106 utilizing vacuum deposition techniques. As described above, to obtain a multilayer photonic structure having the desired properties, adjacent layers of similar materials may be deposited as a single coating layer. For example, in the embodiment of the multilayer photonic structure 400 shown in FIG. 7, adjacent layers of low index material (i.e., the top low index layer of one group and the bottom low index layer of the next subsequent group) were deposited as a single coating layer. FIG. 7 schematically illustrates both the group layer structure of the multilayer photonic structure as well as the coating layers CL actually deposited to achieve the multilayer photonic structure with the desired properties. To form a multilayer photonic structure comprising the groups of layers with the thicknesses indicated in Table 2, a total of nine coating layers CL were deposited on the substrate 106. The thicknesses and material of each coating layer CL are shown in Table 6.

TABLE 6

| Coating Layer (CL) | Thickness (nm) | Material Type |
| --- | --- | --- |
| 1 (first) | 96.3018 | low index |
| 2 | 122.7953 | high index |
| 3 | 182.3853 | low index |
| 4 | 109.7658 | high index |
| 5 | 172.8356 | low index |
| 6 | 110.6184 | high index |
| 7 | 172.9439 | low index |
| 8 | 109.9039 | high index |
| 9 (last) | 86.19178 | low index |

Referring to FIG. 8, the measured and calculated reflectance profiles for the multilayer photonic structure of FIG. 7 are graphically illustrated for angles of incidence of 0 and 45 degrees. The measured reflectance profiles were measured with a Varian Cary Bio 300 UV-Vis Spectrophotometer. The calculated reflectance profiles were determined according to the method described hereinabove to approximate a target reflectance profile having a square-well shape. FIG. 8 graphically demonstrates that the multilayer photonic structures produced according to the methods described herein have measured reflectance profiles which closely approximate the calculated reflectance profiles. For example, the multilayer photonic structure depicted in FIG. 7 and having coating layers with the thicknesses specified in Table 6 has a reflectance profile with a first high reflectivity bandwidth for wavelengths of electromagnetic radiation of less than about 400 nm, a low reflectivity bandwidth for wavelengths of electromagnetic radiation from about 400 nm to about 800 nm, and a second high reflectivity bandwidth for wavelengths of electromagnetic radiation greater than about 800 nm. Further, FIG. 8 also graphically illustrates that the reflectance of the multilayer photonic structure is approximately the same for electromagnetic radiation with angles of incidence from about 0 to 45 degrees with a slight shift in the reflectivity bandwidths occurring at higher angles of incidence.

The multilayer photonic structures described herein may be applied to an article of manufacture, such as a the body panels of a vehicle, windows, lenses and the like, such that the reflective properties of the multilayer photonic structure are imparted to the article of manufacture. For example, in the case of windows, such as windows utilized in vehicles and/or buildings, the multilayer photonic structure may be directly formed on the glass or plastic which comprises the window thereby imparting the reflective properties of the multilayer photonic structure to the window.

Alternatively, the multilayer photonic structure may be incorporated into a paint or similar coating which is subsequently applied to an article of manufacture, such as a vehicle or building. For example, the multilayer photonic structure may be formed or rendered into flakes or discrete particles and incorporated into a liquid carrier, such as an organic or inorganic binder, and utilized in a paint or similar coating system which may be applied to an article of manufacture thereby imparting the reflective properties of the multilayer photonic structure to the article of manufacture. For example, the multilayer photonic structures described herein may first be deposited onto a carrier substrate using the techniques described hereinabove. Thereafter, the multilayer photonic structure is broken up into discrete particles or flakes. In one embodiment, the deposited multilayer photonic structure may first be separated from the substrate before being broken up into discrete particles. For example, the substrate may be pealed from the multilayer photonic structure, such as when the carrier substrate is a flexible, polymeric substrate, flexible alloy, or the like. Alternatively, the carrier substrate may be dissolved in a suitable solution thereby leaving behind the multilayer photonic structure. The multilayer photonic structure may also be pealed from the substrate. In another embodiment, the multilayer photonic structure and substrate are both broken up into discrete particles without separating the multilayer photonic structure from the substrate.

The multilayer photonic structure may be reduced to flakes or discrete particles using various known techniques. For example, the multilayer photonic structure may be milled or tumbled with milling media to crush the multilayer photonic structure and reduce the particle size of any resulting flakes. In one embodiment, a pigment is mixed with the multilayer photonic structure as the multilayer photonic structure is reduced to discrete particles. The flakes or discrete particles of the multilayer photonic structure may have an average thickness from about 0.5 microns to about 10 microns and an average diameter from about 10 microns to about 50 microns. The average thickness, as used herein, means the average value taken from at least three different thickness measurements and the term average diameter is defined as the average value taken from at least three different diameter measurements.

After the multilayer photonic structure has been reduced to flakes, the multilayer photonic structure may be incorporated into a paint or coating system. For example, the multilayer photonic structure (with or without a pigment) may be dispersed in a polymer matrix such that the discrete particles of the multilayer photonic structure are randomly oriented in the matrix. Thereafter, the paint or coating comprising the discrete particles of the multilayer photonic structure may be deposited on an article of manufacture by spraying, electrostatic charging, powder coating, and the like. The deposited coating may thereby impart the reflective properties of the multilayer photonic structure to the substrate to which it is applied.

It should now be understood that the multilayer photonic structures described herein comprise a first high reflectivity bandwidth and a second high reflectivity bandwidth separated by a low reflectivity bandwidth. In particular embodiments the multilayer photonic structures are operable to reflect wavelengths of electromagnetic radiation in the UV and IR portions of the electromagnetic spectrum while transmitting electromagnetic radiation with wavelengths of light in the visible portion of the electromagnetic spectrum. Moreover, the multilayer photonic structures described herein exhibit omnidirectional reflectivity for wavelengths of electromagnetic radiation within the first and second high reflectivity bandwidths which are incident on the multilayer photonic structure for angles of incidence from about 0° to about 45° relative to a normal to the surface of the multilayer photonic structure. Further, the multilayer photonic structures may be applied to various articles of manufacture thereby imparting the reflective properties of the multilayer photonic structure to the specific article of manufacture.

While particular embodiments and aspects of the present invention have been illustrated and described herein, various other changes and modifications can be made without departing from the spirit and scope of the invention. Moreover, although various inventive aspects have been described herein, such aspects need not be utilized in combination. Accordingly, it is therefore intended that the appended claims cover all such changes and modifications that are within the scope of the embodiments shown and described herein.

What is claimed is:

1. A multilayer photonic structure comprising a plurality of coating layers of high index dielectric material having an index of refraction $n_H$ and a plurality of coating layers of low index dielectric material having an index of refraction $n_L$, wherein:

the plurality of coating layers of high index dielectric material and the plurality of coating layers of low index dielectric material are alternately arranged and a first coating layer and a last coating layer of the multilayer photonic structure comprise low index material;

an index-thickness of each coating layer of low index dielectric material is different than the index-thickness of each other coating layer of low index dielectric material;

an index-thickness of each coating layer of high index dielectric material is different than the index-thickness of each other coating layer of high index dielectric material;

the index-thickness of each coating layer of low index dielectric material is different than the index-thickness of each coating layer of high index dielectric material; and the multilayer photonic structure has a first high reflectivity bandwidth, a second high reflectivity bandwidth and a low reflectivity bandwidth for electromagnetic radiation incident on a surface of the multilayer photonic structure in a range from 0 degrees to 45 degrees relative to a normal to the surface of the multilayer photonic structure, wherein the low reflectivity bandwidth is positioned between the first high reflectivity bandwidth and the second high reflectivity bandwidth.

2. The multilayer photonic structure of claim 1 wherein:
the first high reflectivity bandwidth has a reflectance of 50% or greater for wavelengths of electromagnetic radiation within the first high reflectivity bandwidth and incident on a surface of the multilayer photonic structure in a range from 0 degrees to 45 degrees relative to a normal to the surface of the multilayer photonic structure;
the low reflectivity bandwidth has a reflectance of less than 50% for wavelengths of electromagnetic radiation within the low reflectivity bandwidth and incident on a surface of the multilayer photonic structure in a range from 0 degrees to 45 degrees relative to a normal to the surface of the multilayer photonic structure; and
the second high reflectivity bandwidth has a reflectance of 50% or greater for wavelengths of electromagnetic radiation within the second high reflectivity bandwidth and incident on a surface of the multilayer photonic structure in a range from 0 degrees to 45 degrees relative to a normal to the surface of the multilayer photonic structure.

3. The multilayer photonic structure of claim 1 wherein:
the plurality of coating layers of high index material consists of four coating layers of high index dielectric material;
the first high reflectivity bandwidth comprises wavelengths of electro-magnetic radiation in an ultraviolet portion of the electromagnetic spectrum;
the low reflectivity bandwidth comprises wavelengths of electro-magnetic radiation in a visible portion of the electromagnetic spectrum; and
the second high reflectivity bandwidth comprises wavelengths of electro-magnetic radiation in an infrared portion of the electromagnetic spectrum.

4. The multilayer photonic structure of claim 1 wherein:
the first high reflectivity bandwidth has a reflectance of 50% or greater for wavelengths of electro-magnetic radiation less than about 400 nm;
the low reflectivity bandwidth has a reflectance of less than 20% for wavelengths of electro-magnetic radiation from about 400 nm to about 800 nm; and
the second high reflectivity bandwidth has a reflectance of greater than 80% for wavelengths of electro-magnetic radiation greater than about 800 nm.

5. The multilayer photonic structure of claim 1 wherein the index-thickness of each coating layer of the multilayer photonic structure is a non-quarter wave thickness.

6. The multilayer photonic structure of claim 1 wherein a thickness of each coating layer is from about 10 nm to about 400 nm.

7. The multilayer photonic structure of claim 1 wherein the index of refraction $n_L$ is 1.46.

8. The multilayer photonic structure of claim 1 wherein the index of refraction $n_H$ is 2.29.

9. The multilayer photonic structure of claim 1 wherein the high index dielectric material is $TiO_2$.

10. The multilayer photonic structure of claim 1 wherein the low index material is $SiO_2$.

11. A UV-IR reflector comprising a plurality of coating layers of high index dielectric material having an index of refraction $n_H$ and a plurality of coating layers of low index dielectric material having an index of refraction $n_L$, wherein:
the plurality of coating layers of high index dielectric material and the plurality of coating layers of low index dielectric material are alternately arranged and a first coating layer and a last coating layer of the UV-IR reflector comprise low index material;
an index-thickness of each coating layer of low index dielectric material is different than the index-thickness of each other coating layer of low index dielectric material;
an index-thickness of each coating layer of high index dielectric material is different than the index-thickness of each other coating layer of high index dielectric material;
the index-thickness of each coating layer of low index dielectric material is different than the index-thickness of each coating layer of high index dielectric material; and
the UV-IR reflector has a first high reflectivity bandwidth with a reflectance of 50% or greater for wavelengths of electromagnetic radiation in an ultraviolet portion of the electromagnetic spectrum and a second high reflectivity bandwidth with a reflectance of 80% or greater for wavelengths of light in an infrared portion of the electromagnetic spectrum.

12. The UV-IR reflector of claim 11 wherein the first high reflectivity bandwidth includes electromagnetic radiation with a wavelength of about 400 nm or less and the second high reflectivity bandwidth includes electromagnetic radiation with a wavelength of about 800 nm or more.

13. The UV-IR reflector of claim 12 wherein electromagnetic radiation having wavelengths within the first high reflectivity bandwidth and the second high reflectivity bandwidth are omnidirectionally reflected for angles of incidence in a range from 0 degrees to 45 degrees relative to a normal to a surface of the UV-IR reflector.

14. The UV-IR reflector of claim 11 wherein:
the plurality of coating layers of high index material consists of four coating layers of high index material; and
the plurality of coating layers of low index material consists of five coating layers of low index material.

15. The UV-IR reflector of claim 14 wherein the index of refraction $n_L$ is 1.46 and the index of refraction $n_H$ is 2.29.

16. The UV-IR reflector of claim 15 wherein:
the five coating layers of low index material have respective thicknesses of 96.3018 nm, 182.3853 nm, 172.8356 nm, 172.9439 nm, and 86.19178 nm in order of deposition; and
the four coating layers of high index material have respective thicknesses of 122.7953 nm, 109.7658 nm, 110.6184 nm, and 109.9039 nm in order of deposition.

17. An article of manufacture comprising a multilayer photonic structure, the multilayer photonic structure comprising a plurality of coating layers of high index dielectric material having an index of refraction $n_H$ and a plurality of coating layers of low index dielectric material having an index of refraction $n_L$, wherein:
the plurality of coating layers of high index dielectric material and the plurality of coating layers of low index dielectric material are alternately arranged and a first coating layer and a last coating layer of the multilayer photonic structure comprise low index material;
an index-thickness of each coating layer of low index dielectric material is different than the index-thickness of each other coating layer of low index dielectric material;
an index-thickness of each coating layer of high index dielectric material is different than the index-thickness of each other coating layer of high index dielectric material;

the index-thickness of each coating layer of low index dielectric material is different than the index-thickness of each coating layer of high index dielectric material; and the multilayer photonic structure has a first high reflectivity bandwidth, a second high reflectivity bandwidth and a low reflectivity bandwidth for electromagnetic radiation incident on a surface of the multilayer photonic structure in a range from 0 degrees to 45 degrees relative to a normal to the surface of the multilayer photonic structure, wherein the low reflectivity bandwidth is positioned between the first high reflectivity bandwidth and the second high reflectivity bandwidth.

18. The article of manufacture of claim 17 wherein:

the first high reflectivity bandwidth has a reflectance of 50% or greater for wavelengths of electro-magnetic radiation less than about 400 nm bandwidth and incident on a surface of the multilayer photonic structure in a range from 0 degrees to 45 degrees relative to a normal to the surface of the multilayer photonic structure;

the low reflectivity bandwidth has a reflectance of less than 20% for wavelengths of electro-magnetic radiation from about 400 nm to about 800 nm bandwidth and incident on a surface of the multilayer photonic structure in a range from 0 degrees to 45 degrees relative to a normal to the surface of the multilayer photonic structure; and the second high reflectivity bandwidth has a reflectance of greater than 80% for wavelengths of electro-magnetic radiation greater than about 800 nm bandwidth and incident on a surface of the multilayer photonic structure in a range from 0 degrees to 45 degrees relative to a normal to the surface of the multilayer photonic structure.

19. The article of manufacture of claim 17 wherein the multilayer photonic structure is incorporated in a coating.

20. The article of manufacture of claim 19 wherein the coating is a paint.

* * * * *

UNITED STATES PATENT AND TRADEMARK OFFICE
CERTIFICATE OF CORRECTION

PATENT NO.        : 8,593,728 B2
APPLICATION NO.   : 12/686861
DATED             : November 26, 2013
INVENTOR(S)       : Debasish Banerjee et al.

It is certified that error appears in the above-identified patent and that said Letters Patent is hereby corrected as shown below:

Title page, item [75] inventor:

Ishil .. should read Ishii.

Signed and Sealed this
Twentieth Day of May, 2014

Michelle K. Lee
*Deputy Director of the United States Patent and Trademark Office*